US012585544B2

(12) United States Patent　　(10) Patent No.:　US 12,585,544 B2

Bond　　(45) Date of Patent:　Mar. 24, 2026

---

(54) USING A DURABLE FUTURE TO RESUME EXECUTION OF AN OPERATION AFTER A PROCESS THAT INCLUDES THE OPERATION CRASHES

(71) Applicant: Microsoft Technology Licensing, LLC, Redmond, WA (US)

(72) Inventor: Reuben Wade Bond, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 14 days.

(21) Appl. No.: 18/645,327

(22) Filed: Apr. 24, 2024

(65) Prior Publication Data

US 2025/0335302 A1　Oct. 30, 2025

(51) Int. Cl.
*G06F 11/14*　(2006.01)

(52) U.S. Cl.
CPC ................................. *G06F 11/1438* (2013.01)

(58) Field of Classification Search
CPC .................................................. G06F 11/1438
See application file for complete search history.

(56) References Cited

U.S. PATENT DOCUMENTS

| | | | | |
|---|---|---|---|---|
| 8,806,490 | B1 * | 8/2014 | Pulsipher | ............... G06Q 10/10 718/100 |
| 10,528,367 | B1 | 1/2020 | Liu | |
| 2013/0066948 | A1 * | 3/2013 | Colrain | ................. H04L 67/142 709/203 |
| 2013/0066952 | A1 * | 3/2013 | Colrain | ............... G06F 11/1438 709/203 |

OTHER PUBLICATIONS

AWS Step Functions. Nov. 21, 2022. Class AWSStepFunctionsAsync-Client. Retrieved from the Internet. <URL: https://web.archive.org/web/20221129145658/https://docs.aws.amazon.com/AWSJavaSDK/latest/javadoc/com/amazonaws/services/stepfunctions/AWSStepFunctionsAsyncClient.html> (Year: 2022).*

Sebastian Burckhardt, Chris Gillum, David Justo, Konstantinos Kallas, Connor McMahon, and Christopher S. Meiklejohn. 2021. Durable functions: semantics for stateful serverless. Proc. ACM Program. Lang. 5, OOPSLA, Article 133 (Oct. 2021). https://doi.org/10.1145/3485510 (Year: 2021).*

Joonas Westlin. Oct. 27, 2020. Cleaning up Azure Durable Functions execution history. Retrieved from the Internet. <URL: https://joonasw.net/view/cleaning-up-azure-durable-functions-execution-history> (Year: 2020).*

(Continued)

*Primary Examiner* — Michael Maskulinski
*Assistant Examiner* — Bryan P Huang
(74) *Attorney, Agent, or Firm* — Wade IP Law PLLC

(57)　　　　　ABSTRACT

Techniques are described herein that are capable of using a durable future to resume execution of an operation after a process that includes the operation crashes. A durable future, which is a proxy for a state of a workflow, is generated. An identifier that identifies the durable future is assigned, and a state of the durable future is stored in a store. The state of the durable future specifies a portion of the state of the workflow that is known. It is detected that the execution of the operation in the process, which implements at least a portion of the workflow, is discontinued as a result of a crash of the process. After the crash of the process, the state of the durable future is retrieved from the store using the identifier, and the execution of the operation is resumed using the state of the durable future.

20 Claims, 10 Drawing Sheets

(56)     References Cited

OTHER PUBLICATIONS

"Amazon: AWS Step Functions", Amazon|AWS, Dec. 2016, 12 pages.

"Apache Airflow", Apache, 2015, 4 pages.

"Google: Workflows Overview", Google Cloud, Jan. 25, 2021, 8 pages.

Burckhardt, et al., "Netherite: Efficient Execution of Serverless Workflows", VLDB Endowment, Apr. 1, 2022, 14 pages.

Shahidi, et al., "Cross-Platform Performance Evaluation of Stateful Serverless Workflows", IEEE, Nov. 9, 2021, 11 pages.

Zhang et al., "Fault-tolerant and transactional stateful serverless workflows", USENIX, Nov. 4, 2020, 19 pages.

"Distributed Async Await", accessed on link https://www.resonatehq.io/, 2024, 3 pages.

"Futures and promises", accessed on link https://en.wikipedia.org/wiki/Futures_and_promises, 2024, 14 pages.

"Resilience & durability for any function", accessed on link https://restate.dev/, 2023, 11 pages.

"Welcome to DBOS", accessed on link https://docs.dbos.dev/, 2024, 2 pages.

Ramalingam, et al., "Fault Tolerance via Idempotence", accessed on link https://www.microsoft. com/en-us/research/publication/fault-tolerance-via-idempotence/, 2013, 2 pages.

* cited by examiner

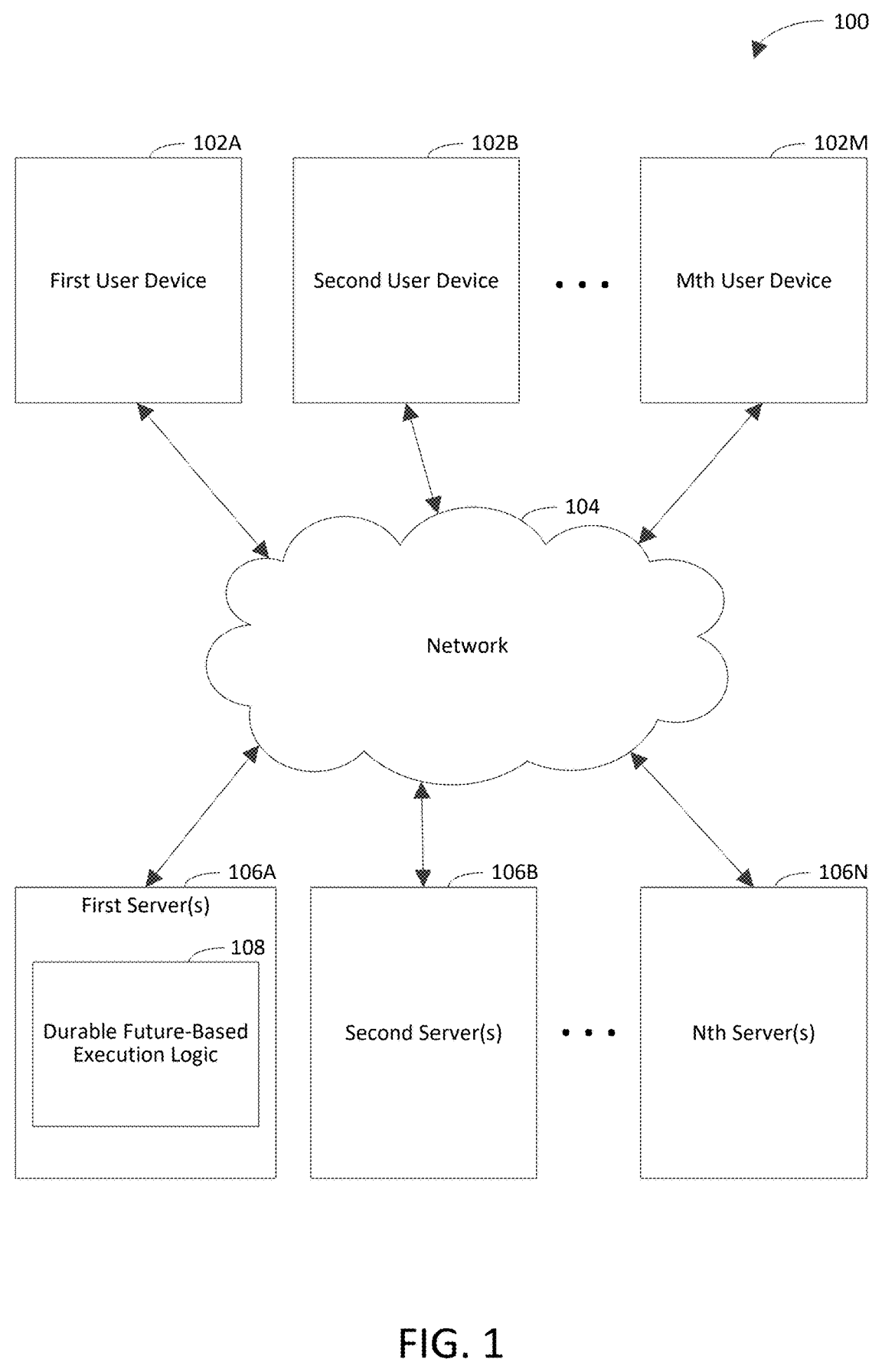

100

102A

First User Device

102B

Second User Device

• • •

102M

Mth User Device

104

Network

106A

First Server(s)

108

Durable Future-Based
Execution Logic

106B

Second Server(s)

• • •

106N

Nth Server(s)

FIG. 1

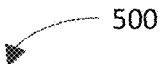

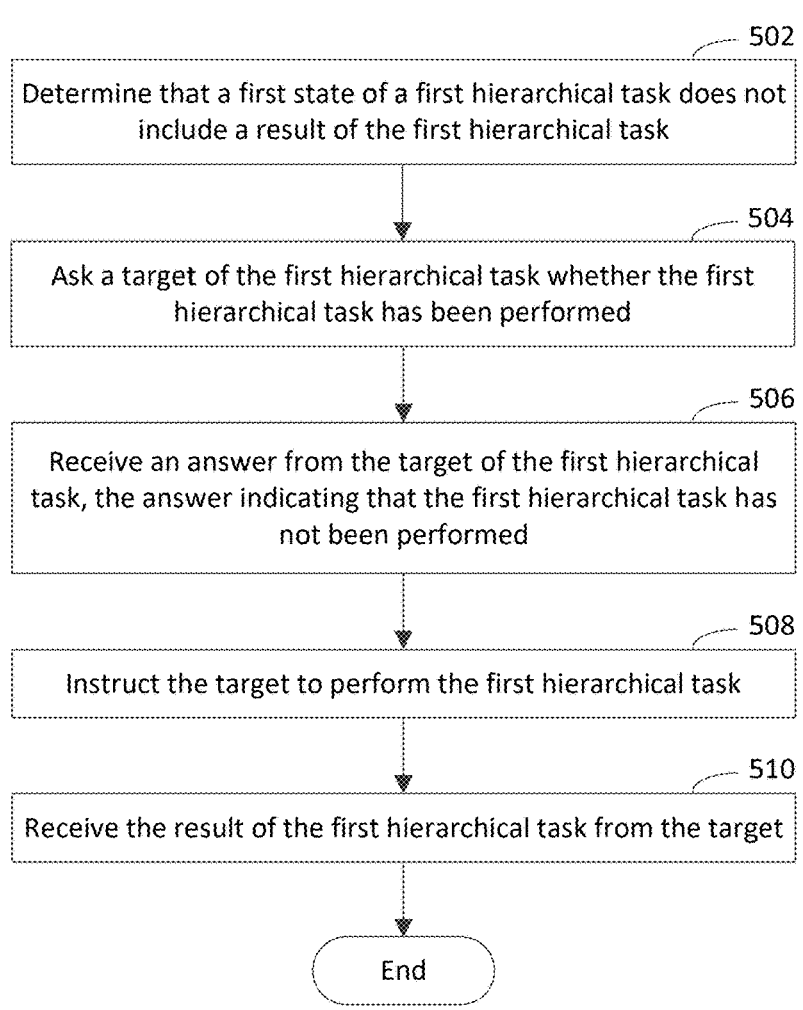

500

502

Determine that a first state of a first hierarchical task does not include a result of the first hierarchical task

504

Ask a target of the first hierarchical task whether the first hierarchical task has been performed

506

Receive an answer from the target of the first hierarchical task, the answer indicating that the first hierarchical task has not been performed

508

Instruct the target to perform the first hierarchical task

510

Receive the result of the first hierarchical task from the target

End

```
var scheduledTask = await bankGrain          702    704
    .Transfer(customer, business, 20) → DurableTask<T>
    .ScheduleAsync("transfer123"); → ScheduledTask<T> var success = await scheduledTask; → T
Console.WriteLine(success ? "Success!" : "Fail : (");
```

```
public interface IAccountGrain : IGrain
{                               802
    DurableTask<bool> Withdraw(int amount);
    DurableTask Deposit(int amount);
} public class BankGrain : IBankGrain
{
    public async DurableTask<bool> Transfer(
        IAccountGrain source,
        IAccountGrain destination,
        int amount)
    {
        bool success = await source.Withdraw(amount).AsStep("withdraw");
        if (!success) return false;
        await destination.Deposit(amount).AsStep("deposit");      804
        return success;
    }                                                       806
}
```

```
[Route("ship")]
[HttpPut]
[ProducesResponseType((int)HttpStatusCode.OK)]
[ProducesResponseType((int)HttpStatusCode.BadRequest)]
Public async DurableTask<IActionResult> ShipOrderAsync(int orderNumber)
{
    var gracePeriodExpired = await DurableTask.Delay(TimeSpan.FromMinutes(5)).AsStep("grace-period");
    if (!gracePeriodExired)
    {
        return StatusCode(204, "Cancelled");
    } var order = await _orderService.GetOrder(orderNumber);

var stockCheckResult = await _catalogService.CheckStock(order).AsStep("check-stock");

if (stockCheckResult.Any(item => !item.HasStock))
    {
        return StatusCode(000, "Out of stock");
    } var invoice = await _invoicingService.CreateInvoice(order).AsStep("create-invoice");
    var paymentResult = await _paymentService.CollectPayment(invoice).AsStep("collect-payment");
    if (!paymentResult.Success)
    {
        return StatusCode(000, "Payment failed");
    }

900

```
    *   *   * var shipmentDetails = await _logisticsService.CreateShipment(order).AsStep("create-shipment");
// TODO: email customer with order confirmation.

var shippingStatus = await _logisticsService.WaitForShipment(order).AsStep("wait-for-shipment");
// email customer with tracking number.

var delivered = await _logisticsService.WaitForDelivery(order).AsStep("wait-for-delivery");

if (!delivered)
{
    return BadRequest();
}

// Clean up, etc.

return ok();
}
```

FIG. 9B

USING A DURABLE FUTURE TO RESUME EXECUTION OF AN OPERATION AFTER A PROCESS THAT INCLUDES THE OPERATION CRASHES

BACKGROUND

Computer programs often implement multi-step processes. For example, an order processing system for an e-commerce application may collect payment from a customer, check and update inventory, coordinate delivery with a logistics service, and update the customer with tracking information. In another example, an expense tracking system may send an employee's expense reimbursement request to a manager for approval, wait for the manager to approve or reject the request, and notify the employee whether the request is approved or rejected. It will be recognized that each step of a multi-step process may include multiple steps (a.k.a. sub-steps or tasks).

Such multi-step processes may be represented using workflows. A workflow defines an end-to-end process, which includes multiple operations that are executed to achieve a result. The operations may be executed sequentially, though any two or more of the operations may be executed concurrently (e.g., simultaneously). Each operation includes one or more tasks, any subset of which may be executed sequentially or concurrently.

A computer program typically utilizes a programming model to execute the end-to-end process that is defined by the workflow. A programming model serves as an interface between a computer program and hardware of a computer on which the computer program runs. The programming model is implied by the hardware. The ability of a computer program to successfully execute a multi-step process using a conventional programming model may be compromised due to errors occurring during execution of the process. An error may be caused by the computer program or by a computer on which the computer program runs. For instance, the computer executing the process can fail at any time, but successful implementation of the workflow requires the process to eventually be completed and the resulting effect on components involved in implementing the workflow to be the same as if the failure did not occur.

SUMMARY

It may be desirable to use a durable future to enable execution of an operation to resume after a process that includes the operation crashes. A durable future is a future that has an assigned (e.g., durable) identifier. The assigned identifier enables the durable future to be identified even after the process crashes. A future is a proxy for a state of a workflow. For instance, the state of the workflow may not be known when the future is generated. Accordingly, the future may serve as a placeholder for the state of the workflow until the state of the workflow becomes known. When the state of the workflow becomes known, the future may be updated to indicate the state of the workflow. For instance, the workflow defines a process that includes multiple operations. As the operations are executed, results of executing the operations (a.k.a. results of the operations) are received from targets that execute the operations. The state of the workflow at a particular time includes the results of the operations that have been received from the targets up to the particular time. Accordingly, results of operations that are received after the particular time are not included in the state of the workflow at the particular time.

By using the assigned identifier to identify the durable future after the process crashes, the durable future may be analyzed to identify the status of the workflow. The status of the workflow indicates a first portion of the operation that was executed prior to the process crashing and a second portion of the operation that was not executed prior to the process crashing. Thus, by determining the status of the workflow, execution of the process may be resumed by executing the second portion of the operation without re-executing the first portion of the operation.

Various approaches are described herein for, among other things, using a durable future to resume execution of an operation after a process that includes the operation crashes. In an example approach, a future that is a proxy for a state of a workflow is generated. The state of the workflow is at least partially unknown at a time instance at which the future is generated. An identifier is assigned to the future to provide a durable future, which enables resumption of execution of an operation after the execution of the operation is discontinued. The identifier identifies the durable future. A state of the durable future is stored in a store. The state of the durable future specifies a portion of the state of the workflow that is known. It is detected that the execution of the operation in a process that implements at least a portion of the workflow is discontinued as a result of a crash of the process. After the crash of the process, actions are performed. The actions include retrieving the state of the durable future from the store using the identifier. The actions further include resuming the execution of the operation using the state of the durable future that is retrieved from the store.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the invention is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the present invention and, together with the description, further serve to explain the principles involved and to enable a person skilled in the relevant art(s) to make and use the disclosed technologies.

FIG. 1 is a block diagram of an example durable future-based execution system in accordance with an embodiment.

FIGS. 2-5 depict flowcharts of example methods for using a durable future to resume execution of an operation after a process that includes the operation crashes in accordance with embodiments.

FIGS. 7-8 depict example code snippets that utilize a durable future in accordance with embodiments.

FIGS. 9A-9B depict respective portions of another example code snippet that utilizes a durable future in accordance with embodiments.

Figure 2:
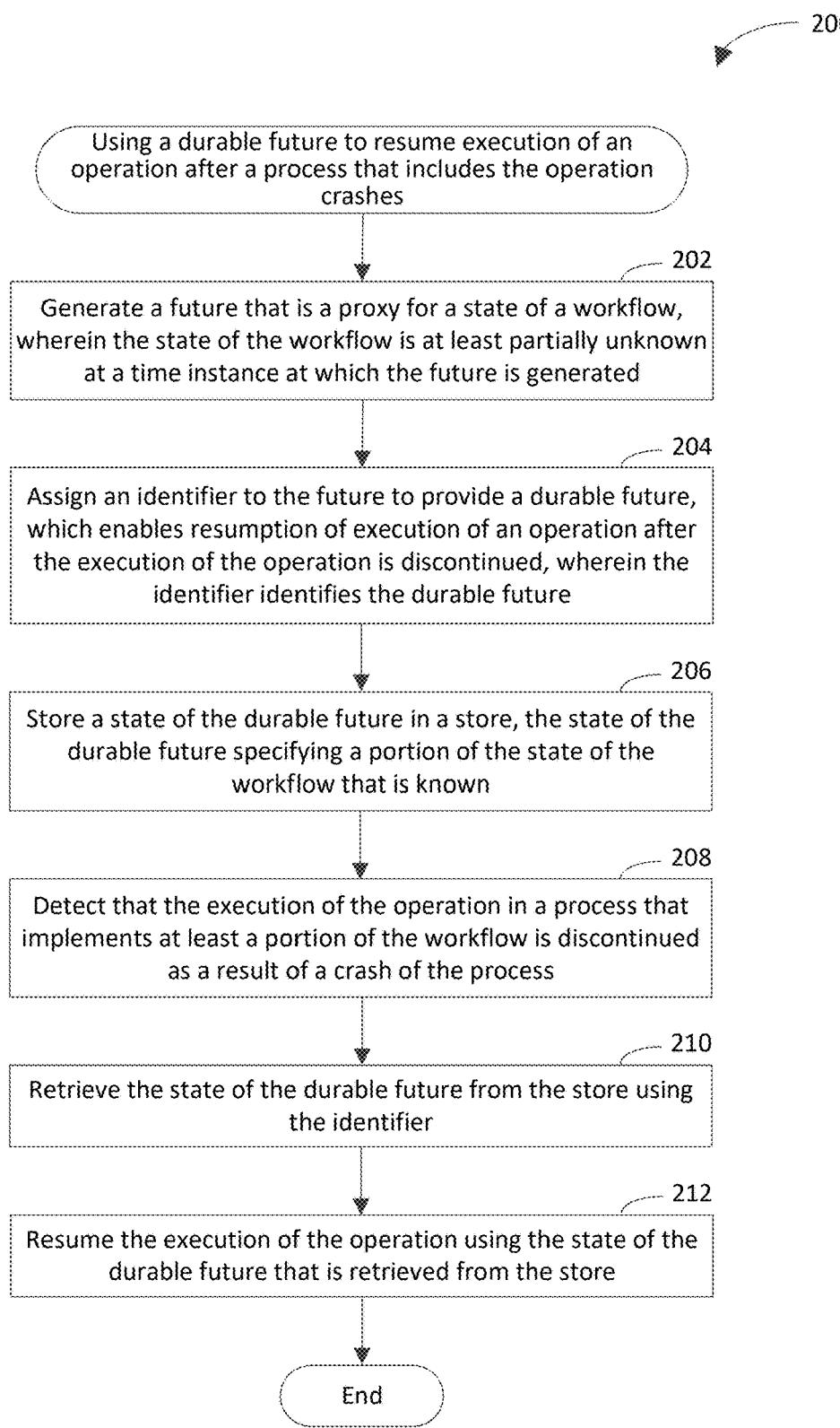

The features and advantages of the disclosed technologies will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Example Embodiments

It may be desirable to use a durable future to enable execution of an operation to resume after a process that includes the operation crashes. A durable future is a future that has an assigned (e.g., durable) identifier. The assigned identifier enables the durable future to be identified even after the process crashes. A future is a proxy for a state of a workflow. For instance, the state of the workflow may not be known when the future is generated. Accordingly, the future may serve as a placeholder for the state of the workflow until the state of the workflow becomes known. When the state of the workflow becomes known, the future may be updated to indicate the state of the workflow. For instance, the workflow defines a process that includes multiple operations. As the operations are executed, results of executing the operations (a.k.a. results of the operations) are received from targets that execute the operations. The state of the workflow at a particular time includes the results of the operations that have been received from the targets up to the particular time. Accordingly, results of operations that are received after the particular time are not included in the state of the workflow at the particular time.

By using the assigned identifier to identify the durable future after the process crashes, the durable future may be analyzed to identify the status of the workflow. The status of the workflow indicates a first portion of the operation that was executed prior to the process crashing and a second portion of the operation that was not executed prior to the process crashing. Thus, by determining the status of the workflow, execution of the process may be resumed by executing the second portion of the operation without re-executing the first portion of the operation.

Example embodiments described herein are capable of using a durable future to resume execution of an operation after a process that includes the operation crashes. In an example approach, a future that is a proxy for a state of a workflow is generated. The state of the workflow is at least partially unknown at a time instance at which the future is generated. An identifier is assigned to the future to provide a durable future, which enables resumption of execution of an operation after the execution of the operation is discontinued. The identifier identifies the durable future. A state of the durable future is stored in a store. The state of the durable future specifies a portion of the state of the workflow that is known. It is detected that the execution of the operation in a process that implements at least a portion of the workflow is discontinued as a result of a crash of the process. After the crash of the process, actions are performed. The actions include retrieving the state of the durable future from the store using the identifier. The actions further include resuming the execution of the operation using the state of the durable future that is retrieved from the store.

Example techniques described herein have a variety of benefits as compared to conventional techniques for resuming execution of a discontinued operation in a process that implements a workflow. For instance, the example techniques are capable of guaranteeing idempotency of tasks that are included in the operation. Idempotency of a task is a property of the task in which execution of the task multiple times produces a same result as executing the task once. Accordingly, a temporally first execution of the task produces the result, and subsequent executions of the task, which temporally follow the temporally first execution, do not produce a result that is different from the result produced by the temporally first execution. It may be said that the result of executing the task remains unchanged regardless of how many times the task is executed. In an aspect, the example techniques are capable of guaranteeing idempotency of all operations in the workflow end-to-end throughout implementation of the workflow. Idempotency of an operation includes idempotency of tasks that are included in the operation.

In an example implementation, consider a money transfer operation in which an amount is withdrawn from a first account before the same amount is deposited into a second account. This example operation includes two tasks for purposes of illustration: (1) withdrawing the amount from the first account and (2) depositing the amount into the second account. When the money transfer operation is complete, the amount should have been deducted from the first account once, and the amount should have been added to the second account once; any other system state is invalid. An incorrect attempt at executing the money transfer operation might include retrying the entire operation from the beginning. Retrying the entire operation from the beginning could result in multiple partial executions of the operation, each having some observable effect on the system. For instance, the multiple partial executions may include multiple withdrawals of the amount from the first account.

The example techniques are capable of completing execution of a multi-step operation in a process that implements a workflow even when an error occurs during the execution. For instance, a result of completing the execution may be the same as if the failure had not occurred. The operations and tasks described herein may be incorporated into a computer program. By assigning identifiers to the operations and tasks, the example techniques enable other operations and/or tasks to be added or removed from the computer program after deployment of the computer program, which may cause the computer program to be more maintainable than conventional computer programs that are configured to implement a workflow. The computer program may be more succinct than the conventional computer programs because separation between portions of the computer program that directly cause side-effects (e.g., "activities" in Temporal® and Azure® Durable Functions™) and portions of the computer program that orchestrate the side-effects (e.g., "orchestrations" or "workflows") is not necessary. The example techniques enable multi-step operations to follow a non-deterministic control flow. Accordingly, the computer program may be less restricted than the conventional computer programs and therefore easier to learn and understand. The example techniques are capable of utilizing an async syntax and a general-purpose programming language (e.g., C#) to enable a developer to write a method that looks like a normal method (e.g., a method for which scheduling and execution are temporally inseparable), though the method is actually working on a durable task (e.g., a task for which scheduling and execution may be temporally separable).

The example techniques enable systems that are idempotent from end-to-end because the durable future context is capable of flowing unique identifiers from callers to callees and is accessible from client to database drivers, which may be a requirement for systems that behave in a straightforward and predictable manner. The example techniques are applicable in a variety of scenarios. For example, hypertext transfer protocol (HTTP) request handlers can be implemented using durable future returning functions, allowing low-ceremony, reliable multi-step operations over HTTP. HTTP clients can be modified to support any one or more of the example techniques and thereby maintain idempotency from client to server. Database object-relational mappings (ORMs) can support durable futures by accessing/updating a table that includes a set of already-completed transactions, allowing developers to implement reliable, idempotent database operations. Remote procedure call (RPC) systems can support the durable future return types.

By utilizing a durable future to enable execution of an operation to resume after a process that includes the operation crashes, the example techniques are capable of implementing a workflow that defines the process more efficiently, accurately, precisely, and/or reliably than conventional techniques. By utilizing the durable future, the example techniques may increase a user experience of a user (e.g., an end user of a computer program that implements the workflow or an information technology (IT) professional who is tasked with managing the computer program that implements the workflow). For instance, by generating a future, assigning an identifier to the future that is a proxy for a state of the workflow, storing a state of the future, retrieving the state of the future using the identifier after the process crashes (thereby causing execution of the operation to be discontinued), and resuming the execution of the operation using the state of the future, the example techniques may increase the user experience of the user. The user experience of the user may be increased, for example, through the increased efficiency, accuracy, precision, and/or reliability with which the workflow is implemented. The example techniques may increase an efficiency of the user by reducing the amount of time that the user otherwise would have consumed to manually resume the execution of the operation after the process crashes.

The example techniques may reduce an amount of time and/or resources (e.g., processor cycles, memory, network bandwidth) that is consumed by a computing system to resume execution of an operation after a process that includes the operation crashes. For instance, by generating a future, assigning an identifier to the future that is a proxy for a state of the workflow, storing a state of the future, retrieving the state of the future using the identifier after the process crashes (thereby causing the execution of the operation to be discontinued), and resuming the execution of the operation using the state of the future, the amount of time and resources that otherwise would have been consumed to resume the execution of the operation manually (e.g., based on instructions received from a user) may be avoided. Moreover, performing the aforementioned actions enables the execution of the operation to be resumed automatically. Automating resumption of the execution of the operation may reduce a cost associated with implementing the workflow. By reducing the amount of time and/or resources that is consumed by the computing system, the efficiency of the computing system may be increased.

FIG. 1 is a block diagram of an example durable future-based execution system 100 in accordance with an embodiment. Generally speaking, the durable future-based execution system 100 operates to provide information to users in response to requests (e.g., hypertext transfer protocol (HTTP) requests) that are received from the users. The information may include documents (Web pages, images, audio files, video files, etc.), output of executables, and/or any other suitable type of information. In accordance with example embodiments described herein, the durable future-based execution system 100 uses a durable future to resume execution of an operation after a process that includes the operation crashes. Detail regarding techniques for using a durable future to resume execution of an operation after a process that includes the operation crashes is provided in the following discussion.

As shown in FIG. 1, the durable future-based execution system 100 includes a plurality of user devices 102A-102M, a network 104, and a plurality of servers 106A-106N. Communication among the user devices 102A-102M and the servers 106A-106N is carried out over the network 104 using well-known network communication protocols. The network 104 may be a wide-area network (e.g., the Internet), a local area network (LAN), another type of network, or a combination thereof.

The user devices 102A-102M are computing systems that are capable of communicating with servers 106A-106N. A computing system is a system that includes at least a portion of a processor system such that the portion of the processor system includes at least one processor that is capable of manipulating data in accordance with a set of instructions. A processor system includes one or more processors, which may be on a same (e.g., single) device or distributed among multiple (e.g., separate) devices. For instance, a computing system may be a computer, a personal digital assistant, etc. The user devices 102A-102M are configured to provide requests to the servers 106A-106N for requesting information stored on (or otherwise accessible via) the servers 106A-106N. For instance, a user may initiate a request for executing a computer program (e.g., an application) using a client (e.g., a Web browser, Web crawler, or other type of client) deployed on a user device 102 that is owned by or otherwise accessible to the user. In accordance with some example embodiments, the user devices 102A-102M are capable of accessing domains (e.g., Web sites) hosted by the servers 104A-104N, so that the user devices 102A-102M may access information that is available via the domains. Such domain may include Web pages, which may be provided as hypertext markup language (HTML) documents and objects (e.g., files) that are linked therein, for example.

Each of the user devices 102A-102M may include any client-enabled system or device, including but not limited to a desktop computer, a laptop computer, a tablet computer, a wearable computer such as a smart watch or a head-mounted computer, a personal digital assistant, a cellular telephone, an Internet of things (IoT) device, or the like. It will be recognized that any one or more of the user devices 102A-102M may communicate with any one or more of the servers 106A-106N.

The servers 106A-106N are computing systems that are capable of communicating with the user devices 102A-102M. The servers 106A-106N are configured to execute computer programs that provide information to users in response to receiving requests from the users. For example, the information may include documents (Web pages, images, audio files, video files, etc.), output of executables, or any other suitable type of information. In accordance with some example embodiments, the servers 106A-106N are configured to host respective Web sites, so that the Web sites are accessible to users of the complex expression-based metadata generation system 100.

One example type of computer program that may be executed by one or more of the servers 106A-106N is a developer tool. A developer tool is a computer program that performs diagnostic operations (e.g., identifying source of problem, debugging, profiling, controlling, etc.) with respect to program code. Examples of a developer tool include an integrated development environment (IDE) and a web development platform. Examples of an IDE include Microsoft Visual Studio® IDE, developed and distributed by Microsoft Corporation; AppCode® IDE, PhpStorm® IDE, Rider® IDE, WebStorm® IDE, etc., developed and distributed by JetBrains s.r.o.; JDeveloper® IDE, developed and distributed by Oracle International Corporation; NetBeans® IDE, developed and distributed by Sun Microsystems, Inc.; Eclipse™ IDE, developed and distributed by Eclipse Foundation; and Android Studio™ IDE, developed and distributed by Google LLC and JetBrains s.r.o. Examples of a web development platform include Windows Azure® platform, developed and distributed by Microsoft Corporation; Amazon Web Services® platform, developed and distributed by Amazon.com, Inc.; Google App Engine® platform, developed and distributed by Google LLC; VMWare® platform, developed and distributed by VMWare, Inc.; and Force-.com® platform, developed and distributed by Salesforce, Inc. It will be recognized that the example techniques described herein may be implemented using a developer tool.

Another example type of a computer program that may be executed by one or more of the servers 106A-106N is a cloud computing program (a.k.a. cloud service). A cloud computing program is a computer program that provides hosted service(s) via a network (e.g., network 104). For instance, the hosted service(s) may be hosted by any one or more of the servers 106A-106N. The cloud computing program may enable users (e.g., at any of the user systems 102A-102M) to access shared resources that are stored on or are otherwise accessible to the server(s) via the network.

The cloud computing program may provide hosted service(s) according to any of a variety of service models, including but not limited to Backend as a Service (BaaS), Software as a Service (SaaS), Platform as a Service (PaaS), and Infrastructure as a Service (IaaS). BaaS enables applications (e.g., software programs) to use a BaaS provider's backend services (e.g., push notifications, integration with social networks, and cloud storage) running on a cloud infrastructure. SaaS enables a user to use a SaaS provider's applications running on a cloud infrastructure. PaaS enables a user to develop and run applications using a PaaS provider's application development environment (e.g., operating system, programming-language execution environment, database) on a cloud infrastructure. IaaS enables a user to use an IaaS provider's computer infrastructure (e.g., to support an enterprise). For example, IaaS may provide to the user virtualized computing resources that utilize the IaaS provider's physical computer resources.

Examples of a cloud computing program include Google Cloud® program, developed and distributed by Google LLC; Oracle Cloud® program, developed and distributed by Oracle Corporation; Amazon Web Services® program, developed and distributed by Amazon.com, Inc.; Salesforce® program, developed and distributed by Salesforce-.com, Inc.; AppSource® and Azure® programs, developed and distributed by Microsoft Corporation; GoDaddy® program, developed and distributed by GoDaddy.com LLC; and Rackspace® program, developed and distributed by Rackspace US, Inc. It will be recognized that the example techniques described herein may be implemented using a cloud computing program. For instance, a software product (e.g., a subscription service, a non-subscription service, or a combination thereof) may include the cloud computing program, and the software product may be configured to perform the example techniques, though the scope of the example embodiments is not limited in this respect.

The first server(s) 106A are shown to include durable future-based execution logic 108 for illustrative purposes. The durable future-based execution logic 108 is configured to use a durable future to resume execution of an operation after a process that includes the operation crashes. In an example implementation, the durable future-based execution logic 108 generates a future that is a proxy for a state of a workflow. The state of the workflow is at least partially unknown at a time instance at which the future is generated. The durable future-based execution logic 108 assigns an identifier to the future to provide a durable future, which enables resumption of execution of an operation after the execution of the operation is discontinued. The identifier identifies the durable future. The durable future-based execution logic 108 stores a state of the durable future in a store. The state of the durable future specifies a portion of the state of the workflow that is known. The durable future-based execution logic 108 detects that the execution of the operation in a process that implements at least a portion of the workflow is discontinued as a result of a crash of the process. After the crash of the process, the durable future-based execution logic 108 performs actions. The actions include retrieving the state of the durable future from the store using the identifier. The actions further include resuming the execution of the operation using the state of the durable future that is retrieved from the store.

The durable future-based execution logic 108 may be implemented in various ways to use a durable future to resume execution of an operation after a process that includes the operation crashes, including being implemented in hardware, software, firmware, or any combination thereof. For example, the durable future-based execution logic 108 may be implemented as computer program code configured to be executed in one or more processors. In another example, at least a portion of the durable future-based execution logic 108 may be implemented as hardware logic/electrical circuitry. For instance, at least a portion of the durable future-based execution logic 108 may be implemented in a field-programmable gate array (FPGA), an application-specific integrated circuit (ASIC), an application-specific standard product (ASSP), a system-on-a-chip system (SoC), a complex programmable logic device (CPLD), etc. Each SoC may include an integrated circuit chip that includes one or more of a processor (a microcontroller, microprocessor, digital signal processor (DSP), etc.), memory, one or more communication interfaces, and/or further circuits and/or embedded firmware to perform its functions.

It will be recognized that the durable future-based execution logic 108 may be (or may be included in) a developer tool and/or a cloud computing program, though the scope of the example embodiments is not limited in this respect.

The durable future-based execution logic 108 is shown to be incorporated in the first server(s) 106A for illustrative purposes and is not intended to be limiting. It will be recognized that the durable future-based execution logic 108 (or any portion(s) thereof) may be incorporated in any one or more of the servers 106A-106N, any one or more of the user devices 102A-102M, or any combination thereof. For example, client-side aspects of the durable future-based execution logic 108 may be incorporated in one or more of the user devices 102A-102M, and server-side aspects of durable future-based execution logic 108 may be incorporated in one or more of the servers 106A-106N.

Figure 6:
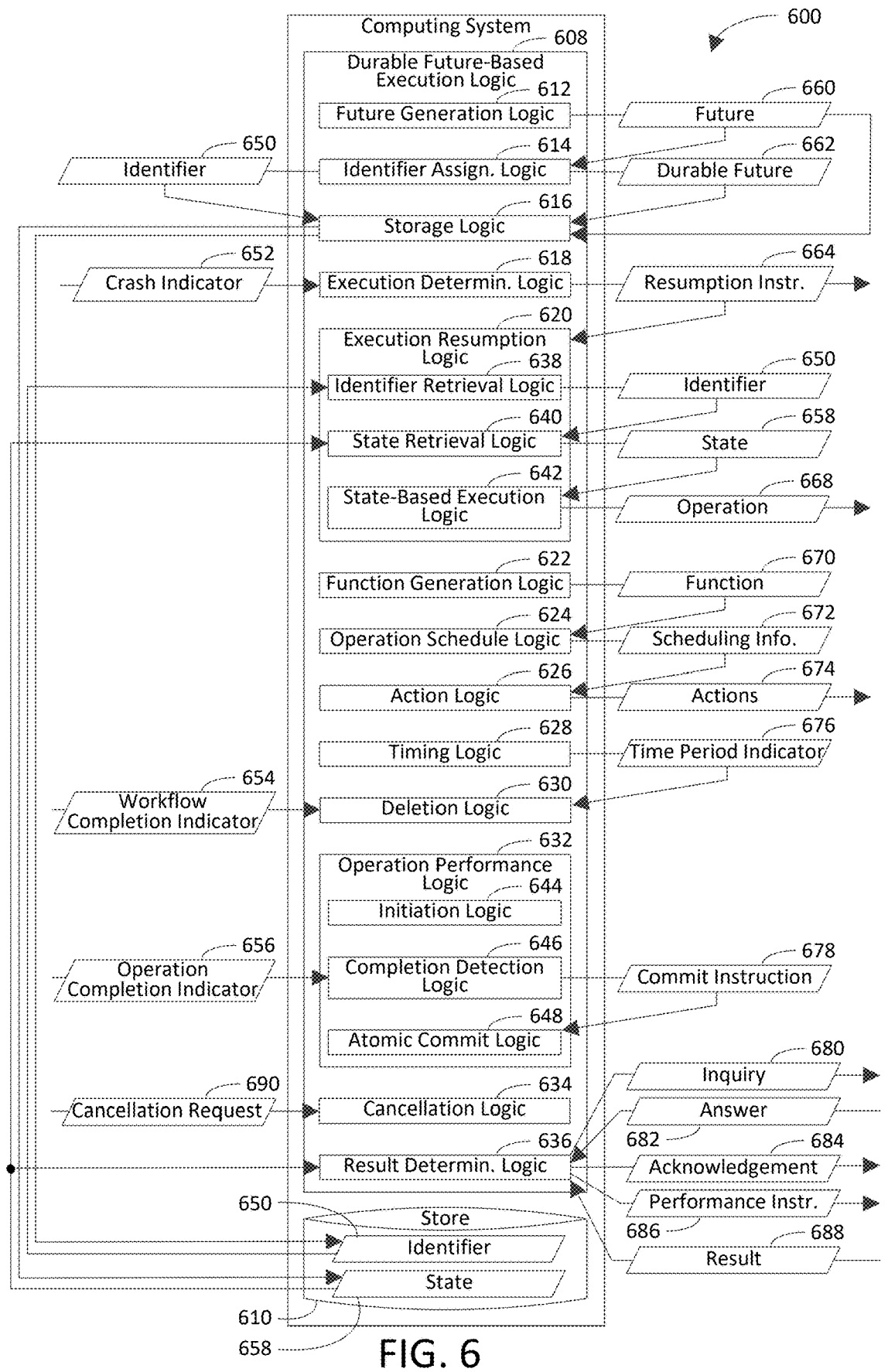
FIG. 6 is a block diagram of an example computing system in accordance with an embodiment.

FIGS. 2-5 depict flowcharts 200, 300, 400, and 500 of example methods for using a durable future to resume execution of an operation after a process that includes the operation crashes in accordance with embodiments. Flowcharts 200, 300, 400, and 500 may be performed by the first server(s) 106A shown in FIG. 1, for example. For illustrative purposes, flowcharts 200, 300, 400, and 500 are described with respect to a computing system 600 shown in FIG. 6, which is an example implementation of the first server(s) 106A. As shown in FIG. 6, the computing system 600 includes durable future-based execution logic 608 and a store 610. The durable future-based execution logic 608 includes future generation logic 612, identifier assignment logic 614, storage logic 616, execution determination logic 618, execution resumption logic 620, function generation logic 622, operation schedule logic 624, action logic 626, timing logic 628, deletion logic 630, operation performance logic 632, cancellation logic 634, and result determination logic 636. The execution resumption logic 620 includes identifier retrieval logic 638, state retrieval logic 640, and state-based execution logic 642. The operation performance logic 632 includes initiation logic 644, completion detection logic 646, and atomic commit logic 648. The store 610 may be any suitable type of store. One type of store is a database. For instance, the store 610 may be a relational database, an entity-relationship database, an object database, an object relational database, an extensible markup language (XML) database, etc. The store 610 is shown to store an identifier 650 that identifies a durable future 662 and a state 658 of the durable future 662 for non-limiting, illustrative purposes. Further structural and operational embodiments will be apparent to persons skilled in the relevant art(s) based on the discussion regarding flowcharts 200, 300, 400, and 500.

As shown in FIG. 2, the method of flowchart 200 begins at step 202. In step 202, a future that is a proxy for a state of a workflow is generated. The state of the workflow is at least partially unknown at a time instance at which the future is generated. In an example implementation, the future generation logic 612 generates a future 660 that is a proxy for the state of the workflow. The state of the workflow is at least partially unknown at a time instance at which the future 660 is generated.

In an example embodiment, the workflow is a long-running transaction. A long-running transaction is a transaction (e.g., a database transaction) that has consistency and durability and that has neither atomicity nor isolation. Consistency, durability, atomicity, and isolation are properties of a database transaction. Consistency requires the database transaction to change affected data only in a manner that is permitted. Durability requires that, when the database transaction has been committed, an effect of the database transaction survives permanently (e.g., even when a system in which the database transaction was performed crashes). Atomicity requires the database transaction to include an indivisible and irreducible series of database operations such that either all of the database operations are performed (e.g., executed) or none of the database operations are performed. Isolation requires that the database transaction does not interact with other database transactions that are performed concurrently with the database transaction.

At step 204, an identifier is assigned to the future to provide a durable future, which enables resumption of execution of an operation after the execution of the operation is discontinued. The identifier identifies the durable future. In an aspect, the identifier is stable (e.g., durable), meaning that the identifier is capable of surviving a fault (e.g., a crash of a process that includes the operation). As a result of the durable future being identified by an identifier that is stable, the durable future is resilient to crashes and other types of faults. For instance, by having the identifier, the durable future may be identified, and a point (e.g., task) in the operation at which the execution of the operation was discontinued may be determined based on (e.g., based at least on) the state of the workflow that is indicated (e.g., specified or represented) by the durable future. In another aspect, the identifier is user-definable (i.e., capable of being defined by a user of the durable future), though the identifier may be defined by the user or by a computing system. In a first example, the identifier is an implicit identifier. For instance, a value of the identifier may be derived based on a location (e.g., an order of execution) of the durable future in a computer program that implements the workflow. In a second example, the identifier is an explicit identifier. For instance, the identifier may be a prefix that is added to a name of the durable future. The identifier may be based on context, such as identifier=UserId+ "_"+CurrentMonth+ "_renew-subscription". In a third example, the identifier includes an implicit identifier and an explicit identifier that identify the durable future. In another aspect, the identifier is a unique identifier within a designated context. For example, the identifier may be unique to the durable future in a context of a function that is configured to return the durable future. In accordance with this example, the context may pertain to a specified (e.g., limited) period of time.

In an example implementation, the identifier assignment logic 614 assigns an identifier 650 to the future 660 to provide the durable future 662, which enables resumption of execution of an operation 668 after the execution of the operation 668 is discontinued. The identifier 650 identifies the durable future 662. In an aspect of this implementation, the identifier 650 initially is associated with the durable future 662 by an external system, which is external to the computing system 600. In accordance with this aspect, the identifier assignment logic 614 is said to assign the identifier 650 to the durable future 662 by using the identifier 650 to identify the durable future 662 based on (e.g., based at least on) the association of the identifier 650 with the durable future 662 by the external system. For instance, the identifier assignment logic 614 may assign the identifier 650 to the durable future 662 by adopting the external system's association of the identifier 650 with the durable future 662.

In an example embodiment, the identifier remains unchanged during an entirety of an implementation of the workflow.

In another example embodiment, the durable future is a type that is defined using a general-purpose programming language (e.g., C#). A type is a category of entities (e.g., computer objects) that is based on one or more attributes shared by the entities. For instance, the type may indicate a kind of data that a variable is capable of taking and a function is capable of returning or taking as an argument. By declaring that an entity has a particular type, it may not be necessary to specify all properties and actions (a.k.a. method) for the entity. A general-purpose programming language is a programming language that is capable of being used to build software in multiple application domains. A programming language is a language that is used to communicate instructions to a machine. An application domain provides an isolation boundary for security, reliability, and versioning and for unloading assemblies. For instance, the application domain may be created by a runtime host that is responsible for bootstrapping a common language runtime before an application is run.

In an example implementation, configuring the durable future as a type provides programmers a way to asynchronously wait for completion of an arbitrarily long-running operation. For instance, an amount of time that is needed to execute the operation may be greater than an acceptable amount of time for a single database transaction or a single web page load. By using the durable future, scheduling of the operation may be temporally separated from execution of the operation.

At step 206, a state of the durable future are stored in a store. The state of the durable future specifies a portion of the state of the workflow that is known. In an aspect, the store is a durable store (a.k.a. a persistent store). A durable store is a store that is capable of retaining information even when power to the store is discontinued (e.g., due to a computer that includes the store shutting down or restarting). For instance, the durable store may be implemented as a file system, a database, a key-value store, or object storage. In an example implementation, the storage logic 616 stores a state 658 of the durable future 662 in the store 610. The state 658 of the durable future 662 specifies the portion of the state of the workflow that is known.

In an example embodiment, storing the state of the durable future in the store at step 206 includes storing the identifier, which identifies the durable future, and the state of the durable future in the store. In an example implementation, the storage logic 616 stores the identifier 650, which identifies the durable future 662, and the state 658 of the durable future 662 in the store 610.

At step 208, discontinuation of the execution of the operation in a process that implements at least a portion of the workflow is detected. The discontinuation of the execution of the operation is a result of a crash of the process. The process may crash due to any of a variety of reasons, including but not limited to a memory management issue (e.g., a computer program that implements the workflow not allocating or deallocating memory properly), memory corruption (e.g., the computer program writing data outside the bounds of an allocated memory block, which may occur due to buffer overflow or pointer misuse), and a bug in the computer program (e.g., a logic error, a race condition, or a memory leak). In an example implementation, the execution determination logic 618 detects that the execution of the operation 668 in the process is discontinued as a result of the crash of the process. In an aspect of this implementation, the execution determination logic 618 receives a crash indicator 652, which indicates that the execution of the operation 668 in the process is discontinued as a result of the crash of the process. The execution determination logic 618 generates a resumption instruction 664, which instructs the execution resumption logic 620 to resume the execution of the operation 668.

At step 210, the state of the durable future is retrieved from the store using the identifier. In an example implementation, the state retrieval logic 640 retrieves the state 658 of the durable future 662 from the store 610 using the identifier 650. In an aspect, receipt of the resumption instruction 664 from the execution determination logic 618 triggers the state retrieval logic 640 to retrieve the state 658 of the durable future 662 from the store 610.

In an example embodiment, retrieving the state of the durable future from the store at step 210 includes retrieving the identifier, which identifies the durable future, and retrieving the state of the durable future from the store using the identifier. In an aspect, receipt of the resumption instruction 664 from the execution determination logic 618 triggers the identifier retrieval logic 638 to retrieve the identifier 650 from the store 610. In an example implementation, identifier retrieval logic 638 and the state retrieval logic collaboratively retrieve the identifier, which identifies the durable future, and the durable future from the store. In an aspect, the identifier retrieval logic 638 retrieves the identifier 650 from the store 610. In accordance with this aspect, the state retrieval logic 640 retrieves the state 658 of the durable future 662 from the store 610 in response to receiving the identifier 650 from the identifier retrieval logic 638.

At step 212, the execution of the operation is resumed using the state of the durable future that is retrieved from the store. In an aspect, the execution of the operation is resumed through completion. Accordingly, resuming the execution of the operation at step 212 may include completing the execution of the operation using the state of the durable future. In another aspect, the execution of the operation is resumed at step 212 in a second process that is different from the process that crashed. In an example implementation, the state-based execution logic 642 resumes the execution of the operation 668 using the state 658 of the durable future 662 that is retrieved from the store 610.

In an example embodiment, the operation includes multiple tasks. In accordance with this embodiment, resuming the execution of the operation at step 212 includes ensuring idempotency of the tasks (e.g., throughout an implementation of the workflow) using the state of the durable feature.

In some example embodiments, one or more steps 202, 204, 206, 208, 210, and/or 212 of flowchart 200 may not be performed. Moreover, steps in addition to or in lieu of steps 202, 204, 206, 208, 210, and/or 212 may be performed. For instance, in an example embodiment, the method of flowchart 200 further includes generating a function that is configured to return the durable future. For instance, the function may be a database application programming interface (API). In an example implementation, the function generation logic 622 generates a function 670 that is configured to return the durable future 662. In accordance with this embodiment, the identifier, which identifies the durable future, is unique to the durable future in context of the function that is configured to return the durable future. In an example implementation, the identifier 650, which identifies the durable future 662, is unique to the durable future 662 in context of the function 670 that is configured to return the durable future 662.

In an aspect of this embodiment, the function includes multiple steps, which return respective durable futures. In accordance with this aspect, the durable future that is returned by the function includes the durable futures returned by the steps in the function. In further accordance with this aspect, the steps may be uniquely identified within the scope of the function. For instance, a programmer may name each step to aid in maintainability, allowing steps to be inserted or retired. The fully qualified step identity is the identity of the durable future. Together, these enable a developer to succinctly express multi-step operations that are capable of surviving system crashes.

In another example embodiment, the method of flowchart 200 further includes scheduling a specified operation to be performed with regard to the function. In an example implementation, the operation schedule logic 624 schedules the specified operation to be performed with regard to the function 670. The operation schedule logic 624 generates scheduling information 672, which indicates (e.g., specifies)

the function 670, the specified operation to be performed, and time instance(s) at which the specified operation is to be performed with regard to the function 670. In accordance with this embodiment, the method of flowchart 200 further includes, in response to scheduling the specified operation, causing the function to perform multiple actions in a single atomic transaction. The actions include updating an internal state of the function and causing a promise that is configured to generate a value of the durable future to be resolved. In an aspect, the internal state of the function includes a set of values of all attributes of the function. Performing the actions in a single atomic transaction means that the actions are indivisible and irreducible such that either all of the actions are performed (e.g., executed) or none of the actions are performed. In an example implementation, in response to the scheduling information 672 indicating that the specified operation has been scheduled, the action logic 626 causes the function 670 to perform actions 674, which include updating an internal state of the function 670 and causing a promise that is configured to generate a value of the durable future 662 to be resolved, in a single atomic transaction.

In yet another example embodiment, the method of flowchart 200 further includes defining a time period to begin at a first time instance at which implementation of the workflow is completed and to end at a second time instance at which the durable future is to be deleted. In an example implementation, the timing logic 628 defines the time period to begin at the first time instance at which the implementation of the workflow is completed and to end at the second time instance at which the durable future 662 is to be deleted. The timing logic 628 generates a time period indicator 676, which indicates (e.g., describes) the time period. For instance, the time period indicator 676 may specify the first time instance, a trigger that establishes the first time instance (i.e., completion of the implementation of the workflow), the second time instance, and/or a duration of time between the first time instance and the second time instance. In accordance with this embodiment, the method of flowchart 200 further includes triggering deletion of the durable future at the second time instance. In an example implementation, the deletion logic 630 triggers deletion of the durable future 662 at the second time instance. In an aspect, the deletion logic 630 receives a workflow completion indicator 654, which indicates that the implementation of the workflow is complete.

In still another example embodiment, the method of flowchart 200 further includes asynchronously scheduling execution of the durable future without waiting for a promise that is configured to generate a value of the durable future to be resolved. In an aspect, asynchronously scheduling the execution of the durable future includes waiting for a confirmation (e.g., a guarantee) that the promise will be resolved. In an example implementation, the storage logic 616 asynchronously schedules execution of the durable future 662 without waiting for a promise that is configured to generate a value of the durable future 662 to be resolved.

Figures 3, 4:
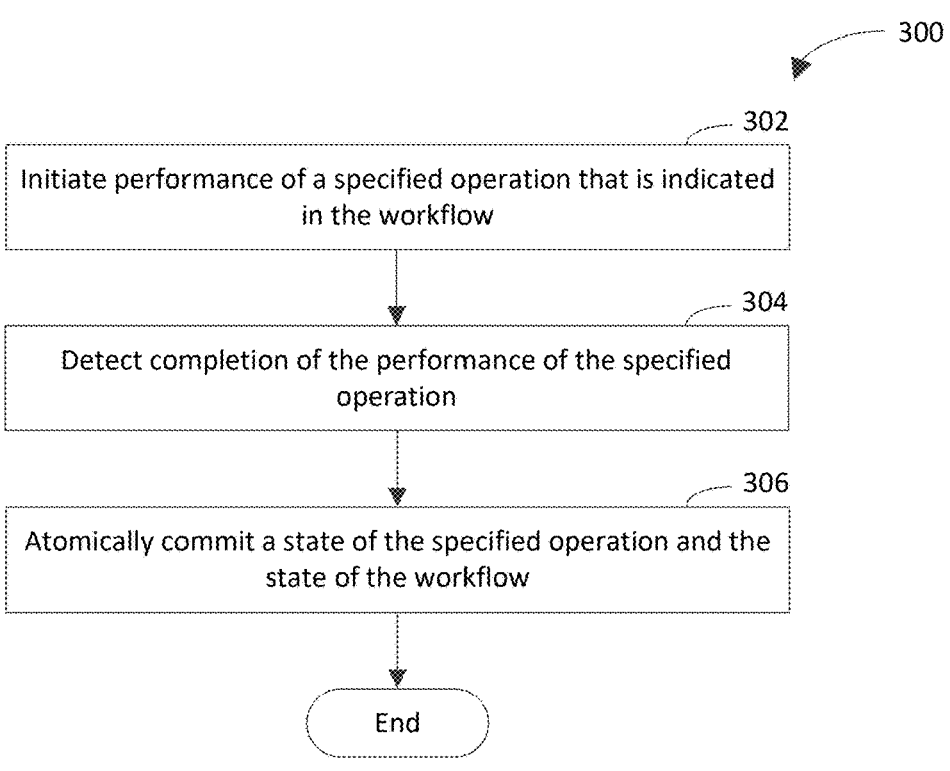

In another example embodiment, the method of flowchart 200 further includes one or more of the steps shown in flowchart 300 of FIG. 3. As shown in FIG. 3, the method of flowchart 300 begins at step 302. In step 302, performance of a specified operation that is indicated in the workflow is initiated. In an aspect, the specified operation is a database operation (i.e., an operation that is performed against a database). In an example implementation, the initiation logic 644 initiates the performance of the specified operation.

At step 304, completion of the performance of the specified operation is detected. In an example implementation, the completion detection logic 646 detects the completion of the performance of the specified operation.

At step 306, in response to completion of the performance of the specified operation, a state of the specified operation and the state of the workflow are atomically committed. Accordingly, the state of the specified operation and the state of the workflow are committed in a single atomic transaction. Committing a state means that change(s) to the state are made permanent. A change to the state may include an addition to the state, a deletion from the state, and/or a modification of the state. In an example implementation, in response to the performance of the specified operation being completed, the atomic commit logic 648 atomically commits the state of the specified operation and the state of the workflow.

In an example hierarchical task embodiment, the operation includes multiple hierarchical tasks. Hierarchical tasks are tasks that are related (e.g., arranged) in accordance with a hierarchy (e.g., a tree). The hierarchy includes multiple hierarchical levels. Each hierarchical level includes a respective subset of the hierarchical tasks. In an aspect, the hierarchical levels correspond to respective hierarchical rankings. In accordance with this aspect, first hierarchical task(s) in a first hierarchical level of the hierarchy have a first hierarchical ranking; second hierarchical task(s) in a second hierarchical level of the hierarchy have a second hierarchical ranking, and so on. The first hierarchical ranking is higher than the second hierarchical ranking, which is higher than the third hierarchical ranking, and so on. Accordingly, a hierarchical task in a relatively higher ranked hierarchical level may be a parent of a hierarchical task in a relatively lower ranked hierarchical level. Similarly, a hierarchical task in a relatively lower ranked hierarchical level may be a child of a hierarchical task in a relatively higher ranked hierarchical level. In an example implementation, the hierarchical rankings correspond to an order in which the hierarchical tasks are executed. For instance, the first hierarchical task(s) in the first hierarchical level having the first hierarchical ranking indicates that the first hierarchical task(s) are executed before hierarchical tasks in other hierarchical levels of the hierarchy. The second hierarchical task(s) in the second hierarchical level having the second hierarchical ranking indicates that the second hierarchical task(s) are executed after the first hierarchical task(s) and before the hierarchical tasks in the third, fourth, etc. hierarchical levels. In accordance with this aspect, the first hierarchical task(s) in the first hierarchical level are executed temporally first; the second hierarchical task(s) in the second hierarchical level are executed temporally second, and so on.

In accordance with this embodiment, assigning the identifier to the future at step 204 includes assigning identifiers to the respective hierarchical tasks. The identifiers identify the hierarchical tasks. In further accordance with this embodiment, the state of the durable future is retrieved from the store using the identifiers, which identify the hierarchical tasks. In an aspect, the state of the durable future indicates for which tasks of the process that implements the workflow results have been received. For instance, when a target executes a task, the target provides a result of executing the task. If the result is received from the target, the state of the durable future indicates that the result is received. If the result is not received from the target, the state of the durable future does not indicate that the result is received.

In an aspect of the hierarchical task embodiment, the method of flowchart 300 includes storing the identifiers, which identify the hierarchical tasks, in the store. For instance, the storage logic 616 may store the identifiers in the store 610. In accordance with this aspect, the method of flowchart 300 includes retrieving the identifiers, which identify the hierarchical tasks, from the store. For example, the identifier retrieval logic 638 may retrieve the identifiers from the store 610.

In another aspect of the hierarchical task embodiment, the hierarchical tasks are defined in a computer program that is written in a general-purpose programming language. For instance, the general-purpose programming language may be C#.

In yet another aspect of the hierarchical task embodiment, the hierarchical tasks are distributed among hierarchical levels of a hierarchy. The hierarchical levels include respective subsets of the hierarchical tasks. For instance, a first hierarchical level of the hierarchy may include a first subset of the hierarchical tasks; a second hierarchical level of the hierarchy may include a second subset of the hierarchical tasks, and so on. In accordance with this aspect, the method of flowchart 200 further includes receiving a request to cancel the operation. In an example implementation, the cancellation logic 634 receives a cancellation request 690, which requests to cancel the operation. In further accordance with this aspect, the method of flowchart 200 further includes, in response to the request to cancel the operation, sequentially cancelling the subsets of the hierarchical tasks in an order from a lowest level of the hierarchical levels to a highest level of the hierarchical levels. In an example implementation, in response to receipt of the cancellation request 690, the cancellation logic 634 sequentially cancels the subsets of the hierarchical tasks in the order from the lowest level of the hierarchical levels to the highest level of the hierarchical levels.

In still another aspect of the hierarchical task embodiment, the state of the durable future specifies states of the respective hierarchical tasks. In accordance with this aspect, the execution of the operation is resumed at step 212 using the states of the respective hierarchical tasks that are specified by the state of the durable future.

In an example of this aspect, resuming the execution of the operation at step 212 includes obtaining a result of each of the hierarchical tasks that was not performed prior to the crash of the process by causing the respective hierarchical task to be performed. In accordance with this example, resuming the execution of the operation at step 212 further includes obtaining a result of each of the hierarchical tasks that was performed prior to the crash of the process from the state of the durable future or from a target of the respective hierarchical task without causing the respective hierarchical task to be performed again.

In another example of this aspect, the states of the respective hierarchical tasks include a first state of a first hierarchical task, which is included in the hierarchical tasks. In accordance with this example, resuming the execution of the operation at step 212 includes one or more of the steps shown in flowchart 400 of FIG. 4. As shown in FIG. 4, the method of flowchart 400 begins at step 402. In step 402, a determination is made that the first state of the first hierarchical task does not include a result of the first hierarchical task. In an example implementation, the result determination logic 636 determines that the first state of the first hierarchical task does not include a result 688 of the first hierarchical task.

At step 404, a target of the first hierarchical task is asked whether the first hierarchical task has been performed. In an example implementation, the result determination logic 636 provides an inquiry 680 to the target of the first hierarchical task. The inquiry 680 asks the target of the first hierarchical task whether the first hierarchical task has been performed.

At step 406, confirmation that the first hierarchical task has been performed is received from the target. The confirmation includes the result of the first hierarchical task that was stored by the target prior to the target being asked whether the first hierarchical task has been performed. In an example implementation, the result determination logic 636 receives an answer 682 to the inquiry 680 from the target. In accordance with this implementation, the answer 682 includes the confirmation that the first hierarchical task has been performed. In further accordance with this implementation, the confirmation includes the result 688 of the first hierarchical task that was stored by the target prior to the inquiry 680 being provided to the target. Accordingly, the target may provide the result in response to the inquiry 680 without a need to perform the first hierarchical task again to obtain the result.

In an implementation of this example, the method of flowchart 200 further includes triggering the target to delete a state of the target, which includes the result of the first hierarchical task that was stored by the target, by acknowledging receipt of the confirmation from the target. For instance, the result determination logic 636 may provide an acknowledgement 684, which acknowledges receipt of the confirmation from the target. By providing the acknowledgement 684, the result determination logic 636 triggers the target to delete the state of the target.

In yet another example of this aspect, the states of the respective hierarchical tasks include a first state of a first hierarchical task, which is included in the hierarchical tasks. In accordance with this example, resuming the execution of the operation at step 212 includes one or more of the steps shown in flowchart 500 of FIG. 5. As shown in FIG. 5, the method of flowchart 500 begins at step 502. In step 502, a determination is made that the first state of the first hierarchical task does not include a result of the first hierarchical task. In an example implementation, the result determination logic 636 determines that the first state of the first hierarchical task does not include the result 688 of the first hierarchical task.

At step 504, a target of the first hierarchical task is asked whether the first hierarchical task has been performed. In an example implementation, the result determination logic 636 provides an inquiry 680 to the target of the first hierarchical task. The inquiry 680 asks the target of the first hierarchical task whether the first hierarchical task has been performed.

At step 506, an answer is received from the target of the first hierarchical task. The answer indicates that the first hierarchical task has not been performed. In an example implementation, the result determination logic 636 receives an answer 682 to the inquiry 680 from the target of the first hierarchical task. In accordance with this implementation, the answer 682 indicates that the first hierarchical task has not been performed.

At step 508, in response to the answer indicating that the first hierarchical task has not been performed, the target is instructed to perform the first hierarchical task. In an example implementation, in response to the answer 682 indicating that the first hierarchical task has not been performed, the result determination logic 636 provides a performance instruction 686 to the target. In accordance with this implementation, the performance instruction 686 instructs the target to perform the first hierarchical task.

At step 510, in response to instructing the target to perform the first hierarchical task, the result of the first hierarchical task is received from the target. In an example implementation, in response to providing the performance instruction 686 to the target, the result determination logic 636 receives the result 688 of the first hierarchical task from the target.

It will be recognized that the computing system 600 may not include one or more of the durable future-based execution logic 608, the store 610, the future generation logic 612, the identifier assignment logic 614, the storage logic 616, the execution determination logic 618, the execution resumption logic 620, the function generation logic 622, the operation schedule logic 624, the action logic 626, the timing logic 628, the deletion logic 630, the operation performance logic 632, the cancellation logic 634, the result determination logic 636, the identifier retrieval logic 638, the state retrieval logic 640, the state-based execution logic 642, the initiation logic 644, the completion detection logic 646, and/or the atomic commit logic 648. Furthermore, the computing system 600 may include components in addition to or in lieu of the durable future-based execution logic 608, the store 610, the future generation logic 612, the identifier assignment logic 614, the storage logic 616, the execution determination logic 618, the execution resumption logic 620, the function generation logic 622, the operation schedule logic 624, the action logic 626, the timing logic 628, the deletion logic 630, the operation performance logic 632, the cancellation logic 634, the result determination logic 636, the identifier retrieval logic 638, the state retrieval logic 640, the state-based execution logic 642, the initiation logic 644, the completion detection logic 646, and/or the atomic commit logic 648.

FIGS. 7-8 depict example code snippets 700 and 800 that utilize a durable future in accordance with embodiments. As shown in FIG. 7, code snippet 700 implements a durable future 702 labeled "scheduledTask" using a grain 704 labeled "bankGrain" for illustrative purposes. A grain is an atomic unit of isolation, distribution, and persistence that is implemented as an object, which represents an entity (e.g., a user, a device, or a session). More particularly, the grain includes a state of the entity and encodes behavior of the entity in code logic. In an aspect, the grain is a primitive of the Orleans programming model and serves as a building block of an Orleans application. It will be recognized that the durable future 702 need not necessarily be implemented using a grain. For instance, the durable future 702 may be implemented using HTTP, SignalR, entity framework, and so on.

As shown in FIG. 8, code snippet 800 implements a durable future 802 labeled "DurableTask". An intent to execute the durable future 802 and current progress (e.g., result) of the durable future 802 are durable. The durable future 802 includes a tree of named subtasks 804 and 806 labeled "AsStep('withdraw')" and "AsStep('deposit')," respectively. Upon recovery, the top-level task is retried with its latest persisted progress. Subtasks that have completed are skipped and replaced with their persisted result. Once a task is completed, a result of the task is persisted. If the task is called again with the same identifier, the already-persisted result is returned immediately for idempotency. It should be noted that steps (e.g., named subtasks 804 and 806) need not necessarily be named explicitly in code. If the steps are not named, identifiers for the steps may be allocated deterministically based on context. For example, by assigning an identifier to a step such that the identifier corresponds to (e.g., is equal to) a value of a counter associated with a parent task of the step in the hierarchy and incrementing the counter each time a value is assigned from counter (e.g., incrementing transfer123/1 to transfer123/2).

FIGS. 9A-9B depict respective portions of another example code snippet 900 that utilizes a durable future in accordance with embodiments. As shown in FIG. 9A, code snippet 900 implements a durable future 902 labeled "DurableTask<IActionResult>," which is returned from an HTTP handler. A method 904, which is labeled "Durable-Task.Delay(TimeSpan.FromMinutes(5))," computes and stores the end time on the first call, avoiding a need to wait five minutes on each retry. Awaiting with named steps 906 and 908 labeled "AsStep('grace-period')" and "AsStep ('check-stock')," respectively, facilitates idempotency and versioning. Each step is executed at least once. Once a step completes, a result of the step is stored. On recovery, the workflow method is re-run, and already-completed steps are replaced with their stored results.

Figure 10:
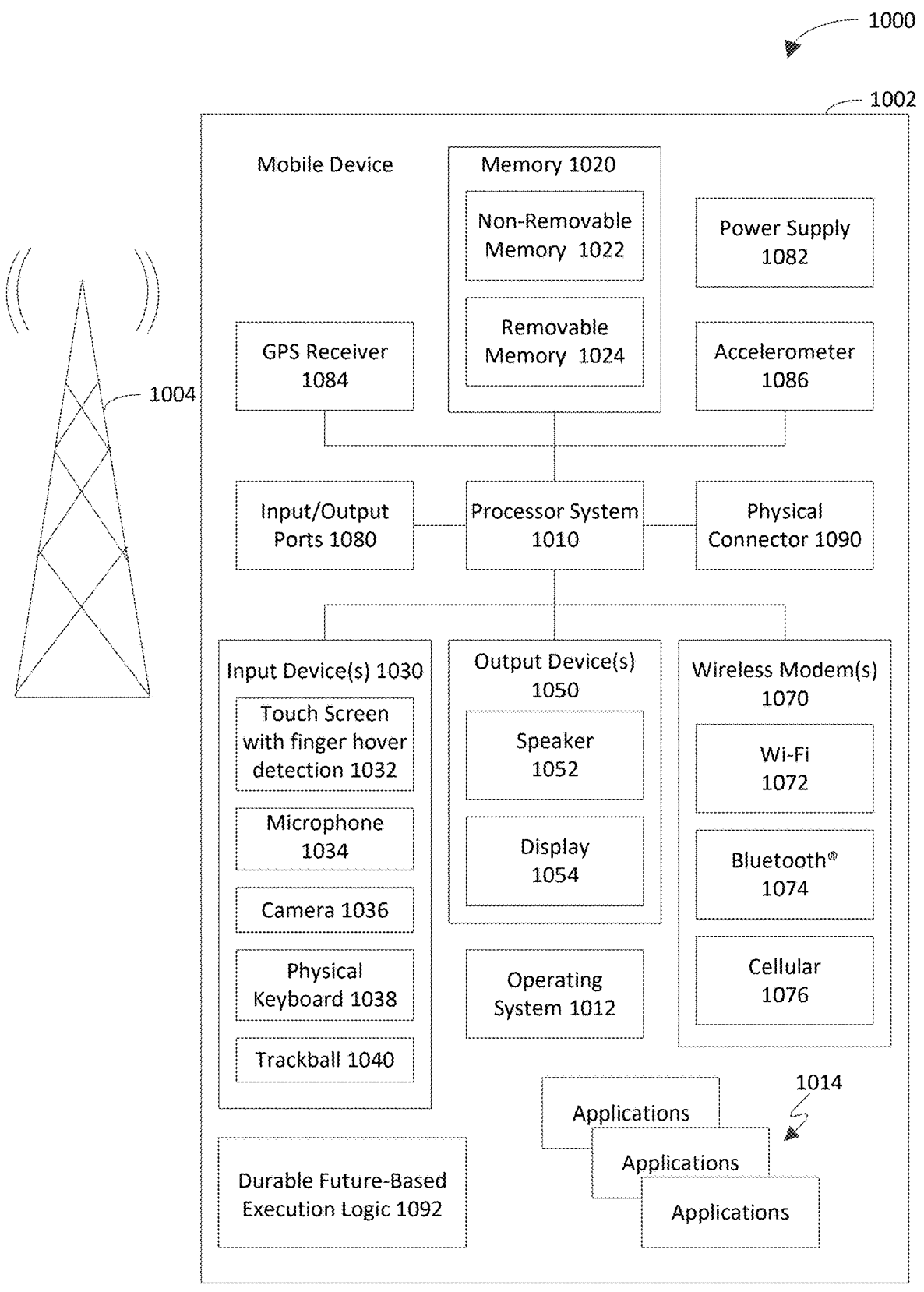
FIG. 10 is a system diagram of an example mobile device in accordance with an embodiment.

FIG. 10 is a system diagram of an example mobile device 1000 including a variety of optional hardware and software components, shown generally as 1002. Any components 1002 in the mobile device may communicate with any other component, though not all connections are shown, for ease of illustration. The mobile device 1000 may be any of a variety of computing devices (e.g., cell phone, smartphone, handheld computer, Personal Digital Assistant (PDA), etc.) and may allow wireless two-way communications with one or more mobile communications networks 1004, such as a cellular or satellite network, or with a local area or wide area network.

The mobile device 1000 includes a processor system 1010 (e.g., signal processor, microprocessor, ASIC, or other control and processing logic circuitry) for performing such tasks as signal coding, data processing, input/output processing, power control, and/or other functions. An operating system 1012 may control the allocation and usage of the components 1002 and support for one or more applications 1014 (a.k.a. application programs). The applications 1014 may include common mobile computing applications (e.g., email applications, calendars, contact managers, web browsers, messaging applications) and any other computing applications (e.g., word processing applications, mapping applications, media player applications).

The mobile device 1000 includes durable future-based execution logic 1092, which is operable in a manner similar to the durable future-based execution logic 108 described above with reference to FIG. 1 and/or the durable future-based execution logic 608 described above with reference to FIG. 6.

The mobile device 1000 includes memory 1020. The memory 1020 may include non-removable memory 1022 and/or removable memory 1024. The non-removable memory 1022 may include random access memory (RAM), read-only memory (ROM), flash memory, a hard disk, or other well-known memory storage technologies. The removable memory 1024 may include flash memory or a Subscriber Identity Module (SIM) card, which is well known in Global System for Mobile Communications (GSM) systems, or other well-known memory storage technologies, such as "smart cards." The memory 1020 may store data and/or code for running the operating system 1012 and the applications 1014. Example data may include web pages, text, images, sound files, video data, or other data sets to be sent to and/or received from one or more network servers or other devices via one or more wired or wireless networks. Memory 1020 may store a subscriber identifier, such as an International Mobile Subscriber Identity (IMSI), and an equipment identifier, such as an International Mobile Equipment Identifier (IMEI). Such identifiers may be transmitted to a network server to identify users and equipment.

The mobile device 1000 may support one or more input devices 1030, such as a touch screen 1032, microphone 1034, camera 1036, physical keyboard 1038 and/or trackball 1040 and one or more output devices 1050, such as a speaker 1052 and a display 1054. Touch screens, such as the touch screen 1032, may detect input in different ways. For example, capacitive touch screens detect touch input when an object (e.g., a fingertip) distorts or interrupts an electrical current running across the surface. As another example, touch screens may use optical sensors to detect touch input when beams from the optical sensors are interrupted. Physical contact with the surface of the screen is not necessary for input to be detected by some touch screens. For example, the touch screen 1032 may support a finger hover detection using capacitive sensing, as is well understood. Other detection techniques may be used, including camera-based detection and ultrasonic-based detection. To implement a finger hover, a user's finger is typically within a predetermined spaced distance above the touch screen, such as between 0.1 to 0.25 inches, or between 0.25 inches and 0.5 inches, or between 0.5 inches and 0.75 inches, or between 0.75 inches and 1 inch, or between 1 inch and 1.5 inches, etc.

Other possible output devices (not shown) may include piezoelectric or other haptic output devices. Some devices may serve more than one input/output function. For example, touch screen 1032 and display 1054 may be combined in a single input/output device. The input devices 1030 may include a Natural User Interface (NUI). An NUI is any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence. Other examples of a NUI include motion gesture detection using accelerometers/gyroscopes, facial recognition, 3D displays, head, eye, and gaze tracking, immersive augmented reality and virtual reality systems, all of which provide a more natural interface, as well as technologies for sensing brain activity using electric field sensing electrodes (e.g., electroencephalography (EEG) and related methods). Thus, in one specific example, the operating system 1012 or applications 1014 may include speech-recognition software as part of a voice control interface that allows a user to operate the mobile device 1000 via voice commands. Furthermore, the mobile device 1000 may include input devices and software that allows for user interaction via a user's spatial gestures, such as detecting and interpreting gestures to provide input to a gaming application.

Wireless modem(s) 1070 may be coupled to antenna(s) (not shown) and may support two-way communications between the processor system 1010 and external devices, as is well understood in the art. The modem(s) 1070 are shown generically and may include a cellular modem 1076 for communicating with the mobile communication network 1004 and/or other radio-based modems (e.g., Bluetooth® 1074 and/or Wi-Fi 1072). At least one of the wireless modem(s) 1070 is typically configured for communication with one or more cellular networks, such as a GSM network for data and voice communications within a single cellular network, between cellular networks, or between the mobile device and a public switched telephone network (PSTN).

The mobile device 1000 may further include at least one input/output port 1080, a power supply 1082, a satellite navigation system receiver 1084, such as a Global Positioning System (GPS) receiver, an accelerometer 1086, and/or a physical connector 1090, which may be a universal serial bus (USB) port, IEEE 1394 (FireWire) port, and/or RS-232 port. The illustrated components 1002 are not required or all-inclusive, as any components may be deleted and other components may be added as would be recognized by one skilled in the art.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods may be used in conjunction with other methods.

Any one or more of the durable future-based execution logic 108, the durable future-based execution logic 608, the future generation logic 612, the identifier assignment logic 614, the storage logic 616, the execution determination logic 618, the execution resumption logic 620, the function generation logic 622, the operation schedule logic 624, the action logic 626, the timing logic 628, the deletion logic 630, the operation performance logic 632, the cancellation logic 634, the result determination logic 636, the identifier retrieval logic 638, the state retrieval logic 640, the state-based execution logic 642, the initiation logic 644, the completion detection logic 646, the atomic commit logic 648, flowchart 200, flowchart 300, flowchart 400, and/or flowchart 500 may be implemented in hardware, software, firmware, or any combination thereof.

For example, any one or more of the durable future-based execution logic 108, the durable future-based execution logic 608, the future generation logic 612, the identifier assignment logic 614, the storage logic 616, the execution determination logic 618, the execution resumption logic 620, the function generation logic 622, the operation schedule logic 624, the action logic 626, the timing logic 628, the deletion logic 630, the operation performance logic 632, the cancellation logic 634, the result determination logic 636, the identifier retrieval logic 638, the state retrieval logic 640, the state-based execution logic 642, the initiation logic 644, the completion detection logic 646, the atomic commit logic 648, flowchart 200, flowchart 300, flowchart 400, and/or flowchart 500 may be implemented, at least in part, as computer program code configured to be executed in one or more processors.

In another example, any one or more of the durable future-based execution logic 108, the durable future-based execution logic 608, the future generation logic 612, the identifier assignment logic 614, the storage logic 616, the execution determination logic 618, the execution resumption logic 620, the function generation logic 622, the operation schedule logic 624, the action logic 626, the timing logic 628, the deletion logic 630, the operation performance logic 632, the cancellation logic 634, the result determination logic 636, the identifier retrieval logic 638, the state retrieval logic 640, the state-based execution logic 642, the initiation logic 644, the completion detection logic 646, the atomic commit logic 648, flowchart 200, flowchart 300, flowchart 400, and/or flowchart 500 may be implemented, at least in part, as hardware logic/electrical circuitry. Such hardware logic/electrical circuitry may include one or more hardware logic components. Examples of a hardware logic component include but are not limited to a field-programmable gate array (FPGA), an application-specific integrated circuit (ASIC), an application-specific standard product (ASSP), a system-on-a-chip system (SoC), a complex programmable logic device (CPLD), etc. For instance, a SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 11:
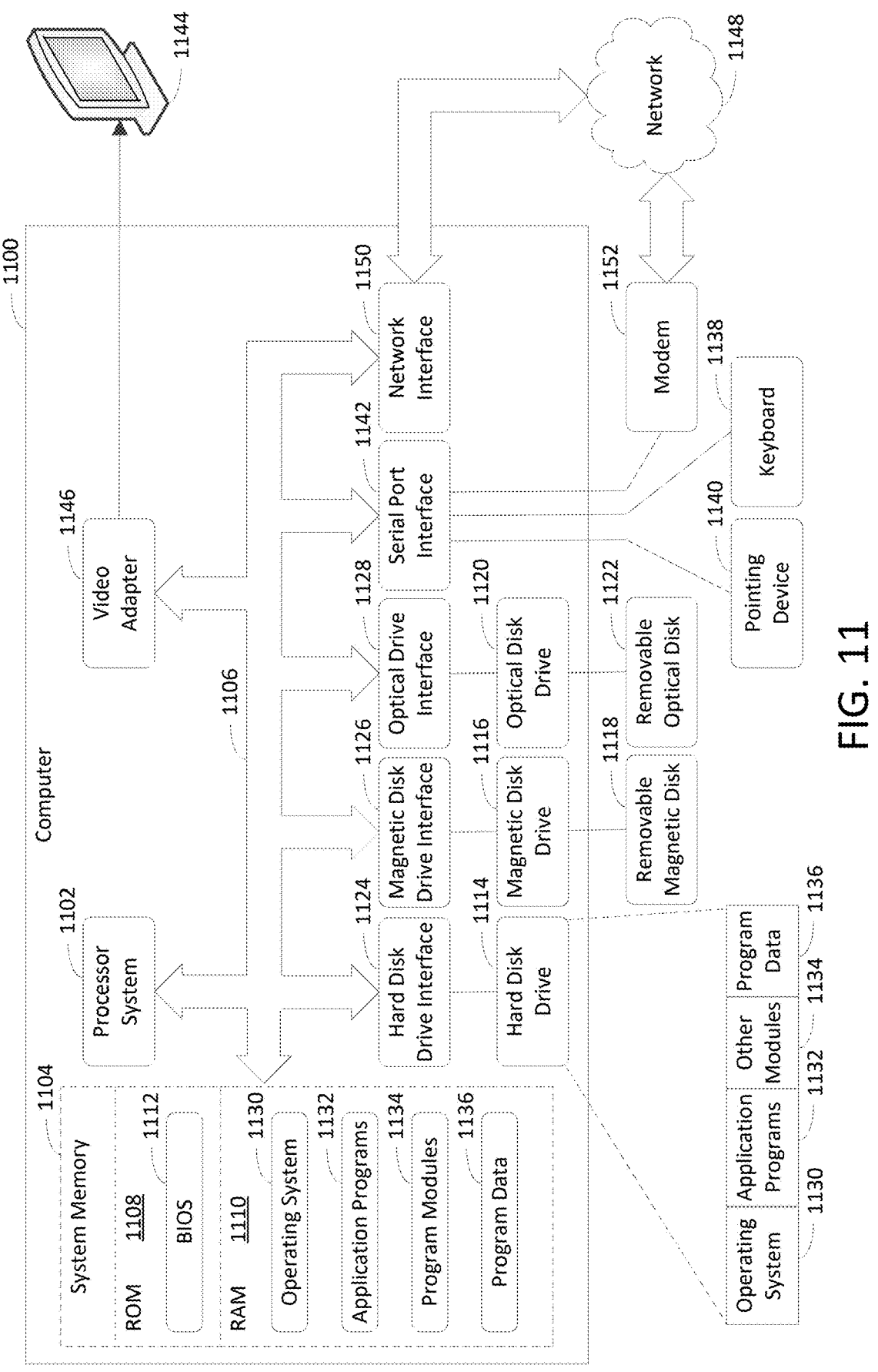
FIG. 11 depicts an example computer in which embodiments may be implemented.

II. Further Discussion of Some Example Embodiments (A1) An example system (FIG. 1, 102A-102M, 106A-106N; FIG. 6, 600; FIG. 10, 1002; FIG. 11, 1100) comprises a processor system (FIG. 10, 1010; FIG. 11, 1102) and a memory (FIG. 10, 1020, 1022, 1024; FIG. 11, 1104, 1108, 1110) that stores computer-executable instructions. The computer-executable instructions are executable by the processor system to at least generate (FIG. 2, 202) a future (FIG. 6, 660) that is a proxy for a state of a workflow. The state of the workflow is at least partially unknown at a time instance at which the future is generated. The computer-executable instructions are executable by the processor system further to at least assign (FIG. 2, 204) an identifier (FIG. 6, 650) to the future to provide a durable future (FIG. 6, 662), which enables resumption of execution of an operation after the execution of the operation is discontinued. The identifier identifies the durable future. The computer-executable instructions are executable by the processor system further to at least store (FIG. 2, 206) a state (FIG. 6, 658) of the durable future in the memory. The state of the durable future specifies a portion of the state of the workflow that is known. The computer-executable instructions are executable by the processor system further to at least detect (FIG. 2, 208) that the execution of the operation in a process that implements at least a portion of the workflow is discontinued as a result of a crash of the process. The computer-executable instructions are executable by the processor system further to at least, after the crash of the process, perform the following actions: retrieve (FIG. 2, 210) the state of the durable future from the memory using the identifier; and resume (FIG. 2, 212) the execution of the operation using the state of the durable future that is retrieved from the memory.

(A2) In the example system of A1, wherein the operation includes a plurality of tasks; and wherein the computer-executable instructions are executable by the processor system to at least: ensure idempotency of the plurality of tasks using the state of the durable feature.

(A3) In the example system of any of A1-A2, wherein the operation includes a plurality of hierarchical tasks; and wherein the computer-executable instructions are executable by the processor system to at least: assign a plurality of identifiers to the plurality of hierarchical tasks, the plurality of identifiers identifying the plurality of hierarchical tasks; and retrieve the state of the durable future from the memory using the plurality of identifiers.

(A4) In the example system of any of A1-A3, wherein the plurality of hierarchical tasks are distributed among a plurality of hierarchical levels of a hierarchy; wherein the plurality of hierarchical levels include respective subsets of the plurality of hierarchical tasks; and wherein the computer-executable instructions are executable by the processor system further to at least: receive a request to cancel the operation; and in response to the request to cancel the operation, sequentially cancel the subsets of the plurality of hierarchical tasks in an order from a lowest level of the plurality of hierarchical levels to a highest level of the plurality of hierarchical levels.

(A5) In the example system of any of A1-A4, wherein the state of the durable future specifies a plurality of states of the plurality of hierarchical tasks; and wherein the computer-executable instructions are executable by the processor system to at least: resume the execution of the operation using the plurality of states of the plurality of hierarchical tasks that are specified by the state of the durable future.

(A6) In the example system of any of A1-A5, wherein the computer-executable instructions are executable by the processor system to resume the execution of the operation by performing at least the following: obtain a result of each of the plurality of hierarchical tasks that was not performed prior to the crash of the process by causing the respective hierarchical task to be performed; and obtain a result of each of the plurality of hierarchical tasks that was performed prior to the crash of the process from the state of the durable future or from a target of the respective hierarchical task without causing the respective hierarchical task to be performed again.

(A7) In the example system of any of A1-A6, wherein the plurality of states includes a first state of a first hierarchical task, which is included in the plurality of hierarchical tasks; and wherein the computer-executable instructions are executable by the processor system to resume the execution of the operation by performing at least the following: determine that the first state of the first hierarchical task does not include a result of the first hierarchical task; ask a target of the first hierarchical task whether the first hierarchical task has been performed; and receive confirmation that the first hierarchical task has been performed from the target, the confirmation including the result of the first hierarchical task that was stored by the target prior to the target being asked whether the first hierarchical task has been performed.

(A8) In the example system of any of A1-A7, wherein the computer-executable instructions are executable by the processor system further to at least: trigger the target to delete a state of the target, which includes the result of the first hierarchical task that was stored by the target, by acknowledging receipt of the confirmation from the target.

(A9) In the example system of any of A1-A8, wherein the plurality of states includes a first state of a first hierarchical task, which is included in the plurality of hierarchical tasks; and wherein the computer-executable instructions are executable by the processor system to resume the execution of the operation by performing at least the following: determine that the first state of the first hierarchical task does not include a result of the first hierarchical task; ask a target of the first hierarchical task whether the first hierarchical task has been performed; receive an answer from the target of the first hierarchical task, the answer indicating that the first hierarchical task has not been performed; in response to the answer indicating that the first hierarchical task has not been performed, instruct the target to perform the first hierarchical task; and in response to the target being instructed to perform the first hierarchical task, receive the result of the first hierarchical task from the target.

(A10) In the example system of any of A1-A9, wherein the plurality of hierarchical tasks are defined in a computer program that is written in a general-purpose programming language.

(A11) In the example system of any of A1-A10, wherein the computer-executable instructions are executable by the processor system further to at least: generate a function that is configured to return the durable future; and wherein the identifier, which identifies the durable future, is unique to the durable future in context of the function that is configured to return the durable future.

(A12) In the example system of any of A1-A11, wherein the computer-executable instructions are executable by the processor system further to at least: schedule a specified operation to be performed with regard to the function; and in response to the specified operation being scheduled, cause the function to perform multiple actions, which include updating an internal state of the function and causing a promise that is configured to generate a value of the durable future to be resolved, in a single atomic transaction.

(A13) In the example system of any of A1-A12, wherein the computer-executable instructions are executable by the processor system further to at least: initiate performance of a specified operation that is indicated in the workflow; detect completion of the performance of the specified operation; and in response to completion of the performance of the specified operation, atomically commit a state of the specified operation and the state of the workflow.

(A14) In the example system of any of A1-A13, wherein the computer-executable instructions are executable by the processor system further to at least: define a time period to begin at a first time instance at which implementation of the workflow is completed and to end at a second time instance at which the durable future is to be deleted; and trigger deletion of the durable future at the second time instance.

(A15) In the example system of any of A1-A14, wherein the workflow is a long-running transaction, which has consistency and durability and which has neither atomicity nor isolation.

(A16) In the example system of any of A1-A15, wherein the durable future is a type that is defined using a general-purpose programming language.

(A17) In the example system of any of A1-A16, wherein the computer-executable instructions are executable by the processor system further to at least: asynchronously schedule execution of the durable future without waiting for a promise that is configured to generate a value of the durable future to be resolved.

(A18) In the example system of any of A1-A17, wherein the identifier remains unchanged during an entirety of an implementation of the workflow.

(B1) An example method is implemented by a computing system (FIG. 1, 102A-102M, 106A-106N; FIG. 6, 600; FIG. 10, 1002; FIG. 11, 1100). The method comprises generating (FIG. 2, 202) a future (FIG. 6, 660) that is a proxy for a state of a workflow. The state of the workflow is at least partially unknown at a time instance at which the future is generated. The method further comprises assigning (FIG. 2, 204) an identifier (FIG. 6, 650) to the future to provide a durable future (FIG. 6, 662), which enables resumption of execution of an operation after the execution of the operation is discontinued. The identifier identifies the durable future. The method further comprises storing (FIG. 2, 206) a state (FIG. 6, 658) of the durable future in a store (FIG. 6, 610). The state of the durable future specifies a portion of the state of the workflow that is known. The method further comprises detecting (FIG. 2, 208) that the execution of the operation in a process that implements at least a portion of the workflow is discontinued as a result of a crash of the process. The method further comprises, after the crash of the process, performing the following actions: retrieving (FIG. 2, 210) the state of the durable future from the store using the identifier; and resuming (FIG. 2, 212) the execution of the operation using the state of the durable future that is retrieved from the store.

(B2) In the example method of B1, wherein the operation includes a plurality of tasks; and wherein resuming the execution of the operation comprises: ensuring idempotency of the plurality of tasks using the state of the durable feature.

(B3) In the example method of any of B1-B2, wherein the operation includes a plurality of hierarchical tasks; wherein assigning the identifier to the future comprises: assigning a plurality of identifiers to the plurality of hierarchical tasks, the plurality of identifiers identifying the plurality of hierarchical tasks; and wherein the state of the durable future is retrieved from the store using the plurality of identifiers.

(B4) In the example method of any of B1-B3, wherein the plurality of hierarchical tasks are distributed among a plurality of hierarchical levels of a hierarchy, wherein the plurality of hierarchical levels include respective subsets of the plurality of hierarchical tasks; and wherein the method further comprises: receiving a request to cancel the operation; and in response to the request to cancel the operation, sequentially cancelling the subsets of the plurality of hierarchical tasks in an order from a lowest level of the plurality of hierarchical levels to a highest level of the plurality of hierarchical levels.

(B5) In the example method of any of B1-B4, wherein the state of the durable future specifies a plurality of states of the plurality of hierarchical tasks; and wherein resuming the execution of the operation comprises: resuming the execution of the operation using the plurality of states of the plurality of hierarchical tasks that are specified by the state of the durable future.

(B6) In the example method of any of B1-B5, wherein resuming the execution of the operation comprises: obtaining a result of each of the plurality of hierarchical tasks that was not performed prior to the crash of the process by causing the respective hierarchical task to be performed; and obtaining a result of each of the plurality of hierarchical tasks that was performed prior to the crash of the process from the state of the durable future or from a target of the respective hierarchical task without causing the respective hierarchical task to be performed again.

(B7) In the example method of any of B1-B6, wherein the plurality of states includes a first state of a first hierarchical task, which is included in the plurality of hierarchical tasks; and wherein resuming the execution of the operation comprises: determining that the first state of the first hierarchical task does not include a result of the first hierarchical task; asking a target of the first hierarchical task whether the first hierarchical task has been performed; and receiving confirmation that the first hierarchical task has been performed from the target, the confirmation including the result of the first hierarchical task that was stored by the target prior to the target being asked whether the first hierarchical task has been performed.

(B8) In the example method of any of B1-B7, further comprising: triggering the target to delete a state of the target, which includes the result of the first hierarchical task that was stored by the target, by acknowledging receipt of the confirmation from the target.

(B9) In the example method of any of B1-B8, wherein the plurality of states includes a first state of a first hierarchical task, which is included in the plurality of hierarchical tasks; and wherein resuming the execution of the operation comprises: determining that the first state of the first hierarchical task does not include a result of the first hierarchical task; asking a target of the first hierarchical task whether the first hierarchical task has been performed; receiving an answer from the target of the first hierarchical task, the answer indicating that the first hierarchical task has not been performed; in response to the answer indicating that the first hierarchical task has not been performed, instructing the target to perform the first hierarchical task; and in response to instructing the target to perform the first hierarchical task, receiving the result of the first hierarchical task from the target.

(B10) In the example method of any of B1-B9, wherein the plurality of hierarchical tasks are defined in a computer program that is written in a general-purpose programming language.

(B11) In the example method of any of B1-B10, further comprising: generating a function that is configured to return the durable future; wherein the identifier, which identifies the durable future, is unique to the durable future in context of the function that is configured to return the durable future.

(B12) In the example method of any of B1-B11, further comprising: scheduling a specified operation to be performed with regard to the function; and in response to scheduling the specified operation, causing the function to perform multiple actions, which include updating an internal state of the function and causing a promise that is configured to generate a value of the durable future to be resolved, in a single atomic transaction.

(B13) In the example method of any of B1-B12, further comprising: initiating performance of a specified operation that is indicated in the workflow; detecting completion of the performance of the specified operation; and in response to completion of the performance of the specified operation, atomically committing a state of the specified operation and the state of the workflow.

(B14) In the example method of any of B1-B13, further comprising: defining a time period to begin at a first time instance at which implementation of the workflow is completed and to end at a second time instance at which the durable future is to be deleted; and triggering deletion of the durable future at the second time instance.

(B15) In the example method of any of B1-B14, wherein the workflow is a long-running transaction, which has consistency and durability and which has neither atomicity nor isolation.

(B16) In the example method of any of B1-B15, wherein the durable future is a type that is defined using a general-purpose programming language.

(B17) In the example method of any of B1-B16, further comprising: asynchronously scheduling execution of the durable future without waiting for a promise that is configured to generate a value of the durable future to be resolved.

(B18) In the example method of any of B1-B17, wherein the identifier remains unchanged during an entirety of an implementation of the workflow.

(C1) An example computer program product (FIG. 10, 1024; FIG. 11, 1118, 1122) comprises a computer-readable storage medium having instructions recorded thereon for enabling a processor-based system (FIG. 1, 102A-102M, 106A-106N; FIG. 6, 600; FIG. 10, 1002; FIG. 11, 1100) to perform operations. The operations comprise generating (FIG. 2, 202) a future (FIG. 6, 660) that is a proxy for a state of a workflow. The state of the workflow is at least partially unknown at a time instance at which the future is generated. The operations further comprise assigning (FIG. 2, 204) an identifier (FIG. 6, 650) to the future to provide a durable future (FIG. 6, 662), which enables resumption of execution of an operation after the execution of the operation is discontinued. The identifier identifies the durable future. The operations further comprise storing (FIG. 2, 206) a state (FIG. 6, 658) of the durable future in a store (FIG. 6, 610). The state of the durable future specifies a portion of the state of the workflow that is known. The operations further comprise detecting (FIG. 2, 208) that the execution of the operation in a process that implements at least a portion of the workflow is discontinued as a result of a crash of the process. The operations further comprise, after the crash of the process, performing the following actions: retrieving (FIG. 2, 210) the state of the durable future from the store using the identifier; and completing (FIG. 2, 212) the execution of the operation using the state of the durable future that is retrieved from the store.

III. Example Computer System

FIG. 11 depicts an example computer 1100 in which embodiments may be implemented. Any one or more of the user devices 102A-102M and/or any one or more of the servers 106A-106N shown in FIG. 1 and/or the computing system 600 shown in FIG. 6 may be implemented using computer 1100, including one or more features of computer 1100 and/or alternative features. Computer 1100 may be a general-purpose computing device in the form of a conventional personal computer, a mobile computer, or a workstation, for example, or computer 1100 may be a special purpose computing device. The description of computer 1100 provided herein is provided for purposes of illustration, and is not intended to be limiting. Embodiments may be implemented in further types of computer systems, as would be known to persons skilled in the relevant art(s).

As shown in FIG. 11, computer 1100 includes a processor system 1102, a system memory 1104, and a bus 1106 that couples various system components including system memory 1104 to processor system 1102. Bus 1106 represents one or more of any of several types of bus structures, including a memory bus or memory controller, a peripheral bus, an accelerated graphics port, and a processor or local bus using any of a variety of bus architectures. System memory 1104 includes read only memory (ROM) 1108 and random access memory (RAM) 1110. A basic input/output system 1112 (BIOS) is stored in ROM 1108.

Computer 1100 also has one or more of the following drives: a hard disk drive 1114 for reading from and writing to a hard disk, a magnetic disk drive 1116 for reading from or writing to a removable magnetic disk 1118, and an optical disk drive 1120 for reading from or writing to a removable optical disk 1122 such as a CD ROM, DVD ROM, or other optical media. Hard disk drive 1114, magnetic disk drive 1116, and optical disk drive 1120 are connected to bus 1106 by a hard disk drive interface 1124, a magnetic disk drive interface 1126, and an optical drive interface 1128, respectively. The drives and their associated computer-readable storage media provide nonvolatile storage of computer-readable instructions, data structures, program modules and other data for the computer. Although a hard disk, a removable magnetic disk and a removable optical disk are described, other types of computer-readable storage media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 1130, one or more application programs 1132, other program modules 1134, and program data 1136. Application programs 1132 or program modules 1134 may include, for example, computer program logic for implementing any one or more of (e.g., at least a portion of) the durable future-based execution logic 108, the durable future-based execution logic 608, the future generation logic 612, the identifier assignment logic 614, the storage logic 616, the execution determination logic 618, the execution resumption logic 620, the function generation logic 622, the operation schedule logic 624, the action logic 626, the timing logic 628, the deletion logic 630, the operation performance logic 632, the cancellation logic 634, the result determination logic 636, the identifier retrieval logic 638, the state retrieval logic 640, the state-based execution logic 642, the initiation logic 644, the completion detection logic 646, the atomic commit logic 648, flowchart 200 (including any step of flowchart 200), flowchart 300 (including any step of flowchart 300), flowchart 400 (including any step of flowchart 400), and/or flowchart 500 (including any step of flowchart 500), as described herein.

A user may enter commands and information into the computer 1100 through input devices such as keyboard 1138 and pointing device 1140. Other input devices (not shown) may include a microphone, joystick, game pad, satellite dish, scanner, touch screen, camera, accelerometer, gyroscope, or the like. These and other input devices are often connected to the processor system 1102 through a serial port interface 1142 that is coupled to bus 1106, but may be connected by other interfaces, such as a parallel port, game port, or a universal serial bus (USB).

A display device 1144 (e.g., a monitor) is also connected to bus 1106 via an interface, such as a video adapter 1146. In addition to display device 1144, computer 1100 may include other peripheral output devices (not shown) such as speakers and printers.

Computer 1100 is connected to a network 1148 (e.g., the Internet) through a network interface or adapter 1150, a modem 1152, or other means for establishing communications over the network. Modem 1152, which may be internal or external, is connected to bus 1106 via serial port interface 1142.

As used herein, the terms "computer program medium" and "computer-readable storage medium" are used to generally refer to media (e.g., non-transitory media) such as the hard disk associated with hard disk drive 1114, removable magnetic disk 1118, removable optical disk 1122, as well as other media such as flash memory cards, digital video disks, random access memories (RAMs), read only memories (ROM), and the like. A computer-readable storage medium is not a signal, such as a carrier signal or a propagating signal. For instance, a computer-readable storage medium may not include a signal. Accordingly, a computer-readable storage medium does not constitute a signal per se. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Example embodiments are also directed to such communication media.

As noted above, computer programs and modules (including application programs 1132 and other program modules 1134) may be stored on the hard disk, magnetic disk, optical disk, ROM, or RAM. Such computer programs may also be received via network interface 1150 or serial port interface 1142. Such computer programs, when executed or loaded by an application, enable computer 1100 to implement features of embodiments discussed herein. Accordingly, such computer programs represent controllers of the computer 1100.

Example embodiments are also directed to computer program products comprising software (e.g., computer-readable instructions) stored on any computer-useable medium. Such software, when executed in one or more data processing devices, causes data processing device(s) to operate as described herein. Embodiments may employ any computer-useable or computer-readable medium, known now or in the future. Examples of computer-readable mediums include, but are not limited to storage devices such as RAM, hard drives, floppy disks, CD ROMs, DVD ROMs, zip disks, tapes, magnetic storage devices, optical storage devices, MEMS-based storage devices, nanotechnology-based storage devices, and the like.

It will be recognized that the disclosed technologies are not limited to any particular computer or type of hardware. Certain details of suitable computers and hardware are well known and need not be set forth in detail in this disclosure.

IV. Conclusion

The foregoing detailed description refers to the accompanying drawings that illustrate exemplary embodiments of the present invention. However, the scope of the present invention is not limited to these embodiments, but is instead defined by the appended claims. Thus, embodiments beyond those shown in the accompanying drawings, such as modified versions of the illustrated embodiments, may nevertheless be encompassed by the present invention.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of one skilled in the relevant art(s) to implement such feature, structure, or characteristic in connection with other embodiments whether or not explicitly described.

Descriptors such as "first", "second", "third", etc. are used to reference some elements discussed herein. Such descriptors are used to facilitate the discussion of the example embodiments and do not indicate a required order of the referenced elements, unless an affirmative statement is made herein that such an order is required.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. A system comprising:
   a processor system; and
   a memory that stores computer-executable instructions that are executable by the processor system to at least:
      generate a future that is a proxy for a state of a workflow, wherein the state of the workflow is at least partially unknown at a time instance at which the future is generated;

assign an identifier to the future to provide a durable future, which enables resumption of execution of an operation after the execution of the operation is discontinued, wherein the identifier identifies the durable future;

store a state of the durable future in the memory, the state of the durable future specifying a portion of the state of the workflow that is known, the state of the durable future specifying a plurality of states of a plurality of hierarchical tasks;

detect that the execution of the operation in a process that implements at least a portion of the workflow is discontinued as a result of a crash of the process;

after the crash of the process, perform the following actions:

retrieve the state of the durable future from the memory using the identifier; and resume the execution of the operation using the plurality of states of the plurality of hierarchical tasks that are specified by the state of the durable future, resumption of the execution of the operation comprising:

ask a target of a first hierarchical task, which is included in the plurality of hierarchical tasks, whether the first hierarchical task has been performed; and receive confirmation that the first hierarchical task has been performed from the target; and trigger the target to delete a state of the target, which includes a result of the first hierarchical task that was stored by the target, by acknowledging receipt of the confirmation from the target.

2. The system of claim 1, wherein the computer-executable instructions are executable by the processor system to at least:

ensure idempotency of the plurality of tasks using the state of the durable future.

3. The system of claim 1, wherein the plurality of hierarchical tasks are distributed among a plurality of hierarchical levels of a hierarchy;

wherein the plurality of hierarchical levels includes respective subsets of the plurality of hierarchical tasks; and wherein the computer-executable instructions are executable by the processor system further to at least:

receive a request to cancel the operation; and in response to the request to cancel the operation, sequentially cancel the subsets of the plurality of hierarchical tasks in an order from a lowest level of the plurality of hierarchical levels to a highest level of the plurality of hierarchical levels.

4. The system of claim 1, wherein the computer-executable instructions are executable by the processor system to resume the execution of the operation by performing at least the following:

obtain a result of each of the plurality of hierarchical tasks that was not performed prior to the crash of the process by causing the respective hierarchical task to be performed; and obtain a result of each of the plurality of hierarchical tasks that was performed prior to the crash of the process from the state of the durable future or from a target of the respective hierarchical task without causing the respective hierarchical task to be performed again.

5. The system of claim 1, wherein the plurality of hierarchical tasks are defined in a computer program that is written in a general-purpose programming language.

6. The system of claim 1, wherein resumption of the execution of the operation comprises:

determine that a first state of the first hierarchical task does not include a result of the first hierarchical task;

ask the target of the first hierarchical task whether the first hierarchical task has been performed as a result of a determination that the first state of the first hierarchical task does not include the result of the first hierarchical task; and receive the confirmation, which includes the result of the first hierarchical task that was stored by the target prior to the target being asked whether the first hierarchical task has been performed.

7. The system of claim 1, wherein the computer-executable instructions are executable by the processor system further to at least:

generate a database application programming interface (API) that is configured to return the durable future; and wherein the identifier, which identifies the durable future, is unique to the durable future in context of the API that is configured to return the durable future.

8. The system of claim 1, wherein the computer-executable instructions are executable by the processor system further to at least:

generate a function that is configured to return the durable future, the function including multiple steps that return respective durable futures;

wherein the identifier, which identifies the durable future, is unique to the durable future in context of the function that is configured to return the durable future; and wherein the durable future that is returned by the function includes the durable futures returned by the steps in the function.

9. A method implemented by a computing system, the method comprising:

generating a future that is a proxy for a state of a workflow, wherein the state of the workflow is at least partially unknown at a time instance at which the future is generated;

assigning an identifier to the future to provide a durable future, which enables resumption of execution of an operation after the execution of the operation is discontinued, wherein the identifier identifies the durable future;

storing a state of the durable future in a store, the state of the durable future specifying a portion of the state of the workflow that is known, the state of the durable future specifying a plurality of states of a plurality of hierarchical tasks;

detecting that the execution of the operation in a process that implements at least a portion of the workflow is discontinued as a result of a crash of the process; and after the crash of the process, performing the following actions:

retrieving the state of the durable future from the store using the identifier; and resuming the execution of the operation using the plurality of states of the plurality of hierarchical tasks that are specified by the state of the durable future, wherein resuming the execution of the operation comprises:

asking a target of a first hierarchical task, which is included in the plurality of hierarchical tasks, whether the first hierarchical task has been performed; and receiving an answer from the target of the first hierarchical task, the answer indicating that the first hierarchical task has not been performed.

10. The method of claim 9, further comprising:

generating a function that is configured to return the durable future;

wherein the identifier, which identifies the durable future, is unique to the durable future in context of the function that is configured to return the durable future.

11. The method of claim 10, further comprising:

scheduling a specified operation to be performed with regard to the function; and in response to scheduling the specified operation, causing the function to perform multiple actions, which include updating an internal state of the function and causing a promise that is configured to generate a value of the durable future to be resolved, in a single atomic transaction.

12. The method of claim 9, further comprising:

initiating performance of a specified operation that is indicated in the workflow;

detecting completion of the performance of the specified operation; and in response to completion of the performance of the specified operation, atomically committing a state of the specified operation and the state of the workflow.

13. The method of claim 9, further comprising:

defining a time period to begin at a first time instance at which implementation of the workflow is completed and to end at a second time instance at which the durable future is to be deleted; and triggering deletion of the durable future at the second time instance.

14. The method of claim 9, wherein the workflow is a long-running transaction, which has consistency and durability and which has neither atomicity nor isolation.

15. The method of claim 9, wherein the durable future is a type that is defined using a general-purpose programming language.

16. The method of claim 9, further comprising:

asynchronously scheduling execution of the durable future without waiting for a promise that is configured to generate a value of the durable future to be resolved.

17. The method of claim 16, wherein asynchronously scheduling the execution of the durable future comprises:

waiting for a confirmation that the promise will be resolved.

18. The method of claim 9, wherein the identifier remains unchanged during an entirety of an implementation of the workflow.

19. The method of claim 9, wherein resuming the execution of the operation comprises:

determining that a first state of the first hierarchical task, which is included in the plurality of states, does not include a result of the first hierarchical task; and as a result of determining that the first state of the first hierarchical task does not include the result of the first hierarchical task, asking the target of the first hierarchical task whether the first hierarchical task has been performed.

20. A computer program product comprising a computer-readable storage medium having instructions recorded thereon for enabling a processor-based system to perform operations, the operations comprising:

generating a future that is a proxy for a state of a workflow, wherein the state of the workflow is at least partially unknown at a time instance at which the future is generated;

assigning an identifier to the future to provide a durable future, which enables resumption of execution of an operation after the execution of the operation is discontinued, wherein the identifier identifies the durable future;

storing a state of the durable future in a store, the state of the durable future specifying a portion of the state of the workflow that is known, the state of the durable future specifying a plurality of states of a plurality of hierarchical tasks;

detecting that the execution of the operation in a process that implements at least a portion of the workflow is discontinued as a result of a crash of the process; and after the crash of the process, performing the following actions:

retrieving the state of the durable future from the store using the identifier; and resuming the execution of the operation using the plurality of states of the plurality of hierarchical tasks that are specified by the state of the durable future, wherein resuming the execution of the operation comprises:

asking a target of a first hierarchical task, which is included in the plurality of hierarchical tasks, whether the first hierarchical task has been performed; and receiving an answer from the target of the first hierarchical task, the answer indicating that the first hierarchical task has not been performed.

* * * * *